United States Patent [19]

Ho et al.

[11] Patent Number: 4,577,274

[45] Date of Patent: Mar. 18, 1986

[54] DEMAND PAGING SCHEME FOR A MULTI-ATB SHARED MEMORY PROCESSING SYSTEM

[75] Inventors: Gary S. Ho, San Jose, Calif.; Ralph W. Peterson, Naperville, Ill.

[73] Assignee: AT&T Bell Laboratories, Murray Hill, N.J.

[21] Appl. No.: 512,379

[22] Filed: Jul. 11, 1983

[51] Int. Cl.[4] ...................... G06F 12/12; G06F 12/10; G06F 12/06; G06F 13/00

[52] U.S. Cl. .................................................... 364/200

[58] Field of Search ... 364/200 MS File, 900 MS File

[56] References Cited

U.S. PATENT DOCUMENTS

| | | | |
|---|---|---|---|
| 3,947,823 | 4/1976 | Padegs et al. | 364/200 |
| 4,096,568 | 6/1978 | Bennett et al. | 364/200 |
| 4,145,738 | 4/1979 | Inoue et al. | 364/200 |
| 4,228,503 | 10/1980 | Waite et al. | 364/200 |
| 4,231,088 | 10/1980 | Hammer et al. | 364/200 |
| 4,277,826 | 7/1981 | Collins et al. | 364/200 |
| 4,320,456 | 3/1982 | Heise et al. | 364/200 |
| 4,481,573 | 11/1984 | Fukunaga et al. | 364/200 |
| 4,525,778 | 6/1985 | Cane | 364/200 |

OTHER PUBLICATIONS

A. S. Coscarella et al., "System for Purging TLB" *IBM Technical Disclosure Bulletin*, vol. 24, No. 2, Jul. 1981, pp. 910-911.

H. M. Levy and P. H. Lipman, "Virtual Memory Management in the VAX/VMS Operating System," *Computer*, pp. 35-41, (Mar. 1982).

O. Babaoglu and W. Joy, "Converting a Swap-Based System to do Paging in an Architecture Lacking Page-Referenced Bites," *Proceedings of the Eighth Symposium on Operating Systems Principles*, pp. 78-86 (14-16 Dec. 1981, Pacific Grove, CA).

*Primary Examiner*—James D. Thomas
*Assistant Examiner*—William G. Niessen
*Attorney, Agent, or Firm*—David Volejnicek

[57] ABSTRACT

Disclosed is a demand paging scheme for a shared memory processing system that uses paged virtual memory addressing and includes a plurality of address translation buffers (ATBs). Page frames of main memory that hold pages being considered for swapping from memory are sequestered and flags, one corresponding to each ATB in the system, are cleared. Each time an ATB is flushed, its associated flag is set. Setting of all the flags indicates that the address translation information of pages held by selected sequestered page frames does not appear in any ATB and that the selected pages may be swapped from main memory.

36 Claims, 13 Drawing Figures

100
MAIN MEMORY
PT
109
112
V 113
R 214
M 215
IWTBF FLAG S
218
218
IWTBF LIST
216
217
217
PT
110
FREE LIST
222
219
219
219
TO SELECTED PFS 114-116
PT
111
SWAPOUT QUEUE
220
221
221
SWAPIN QUEUE
225
226
226

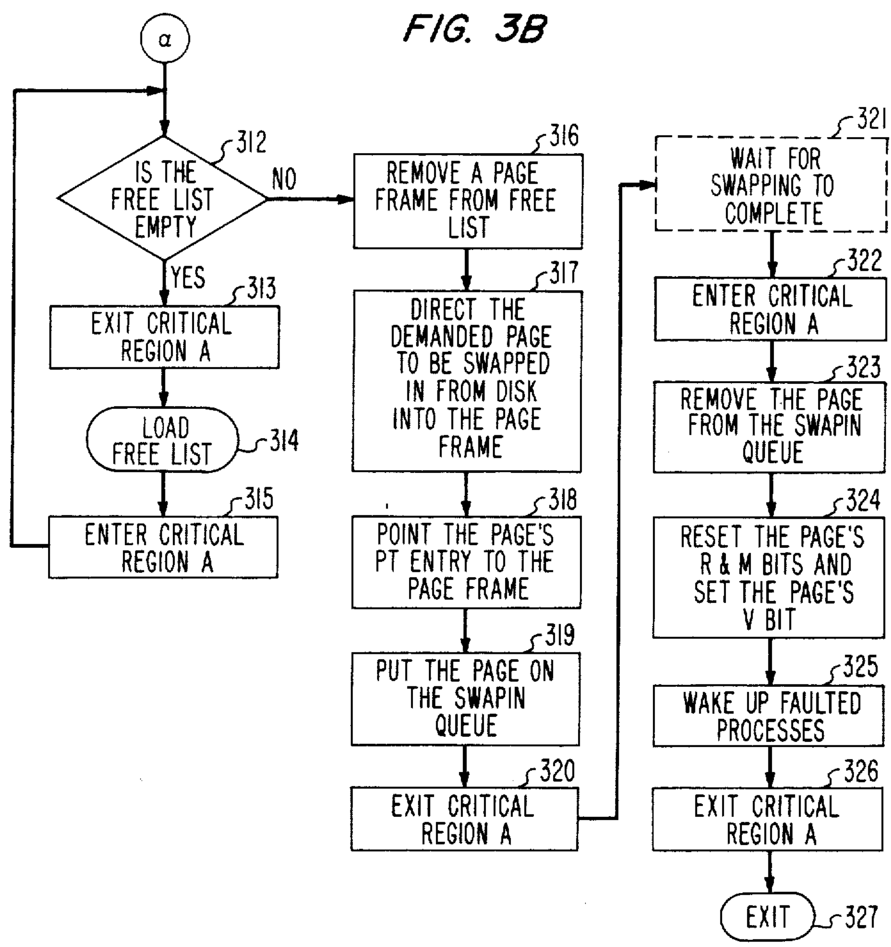
FIG. 3B
α
IS THE FREE LIST EMPTY
312
NO
YES
REMOVE A PAGE FRAME FROM FREE LIST
316
EXIT CRITICAL REGION A
313
LOAD FREE LIST
314
ENTER CRITICAL REGION A
315
DIRECT THE DEMANDED PAGE TO BE SWAPPED IN FROM DISK INTO THE PAGE FRAME
317
POINT THE PAGE'S PT ENTRY TO THE PAGE FRAME
318
PUT THE PAGE ON THE SWAPIN QUEUE
319
EXIT CRITICAL REGION A
320
WAIT FOR SWAPPING TO COMPLETE
321
ENTER CRITICAL REGION A
322
REMOVE THE PAGE FROM THE SWAPIN QUEUE
323
RESET THE PAGE'S R & M BITS AND SET THE PAGE'S V BIT
324
WAKE UP FAULTED PROCESSES
325
EXIT CRITICAL REGION A
326
EXIT
327

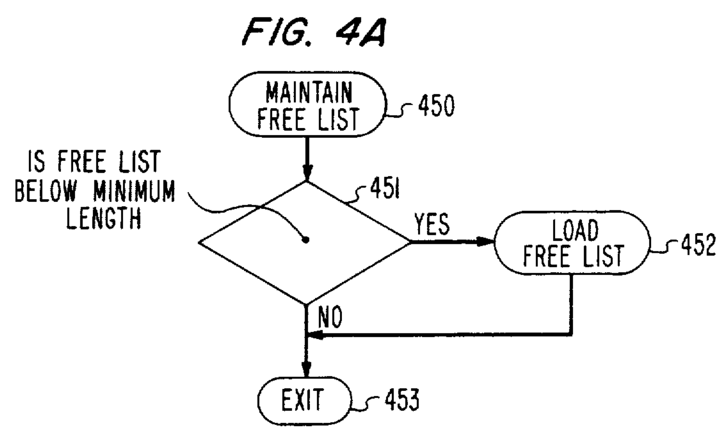
FIG. 4A
MAINTAIN FREE LIST
450
IS FREE LIST BELOW MINIMUM LENGTH
451
YES
LOAD FREE LIST
452
NO
EXIT
453

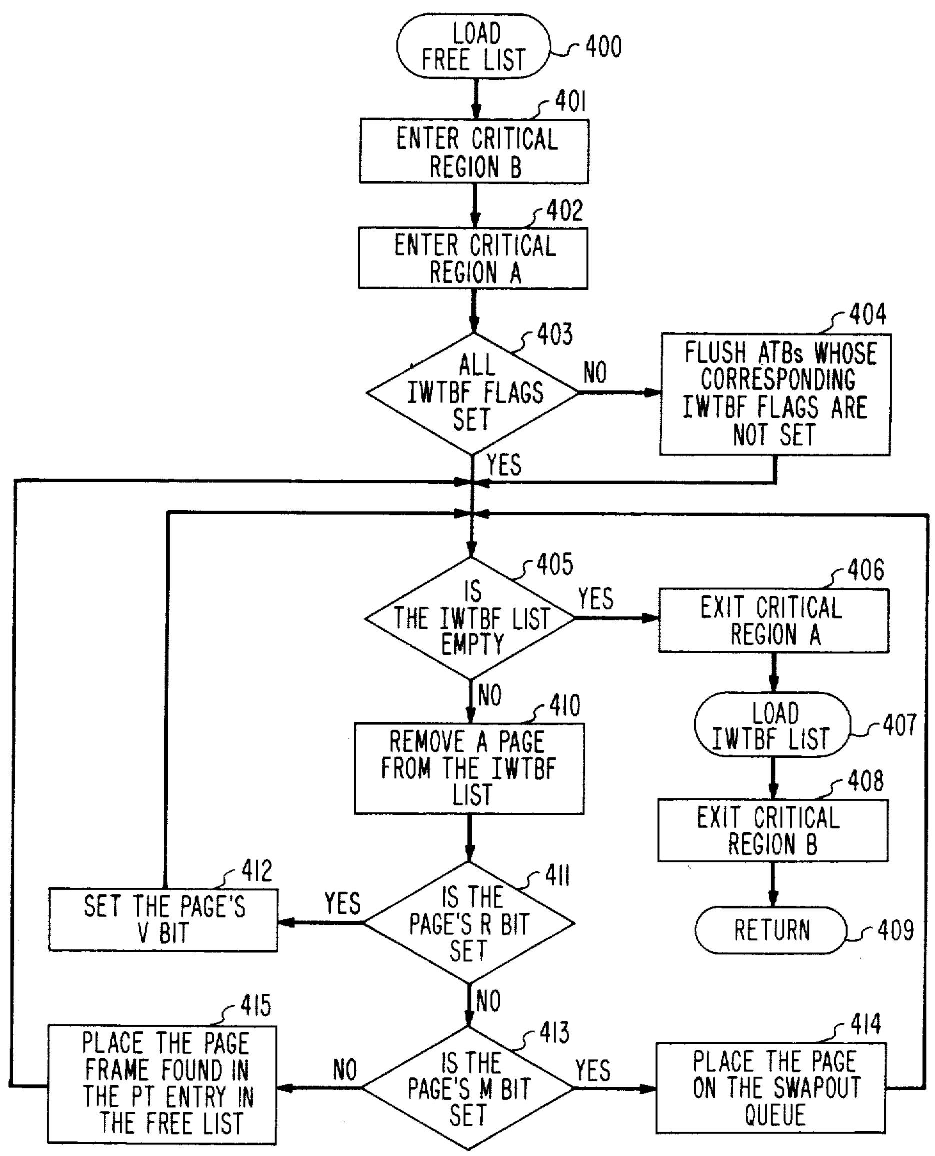
FIG. 4B
LOAD FREE LIST
400
ENTER CRITICAL REGION B
401
ENTER CRITICAL REGION A
402
ALL IWTBF FLAGS SET
403
NO
YES
FLUSH ATBs WHOSE CORRESPONDING IWTBF FLAGS ARE NOT SET
404
IS THE IWTBF LIST EMPTY
405
YES
NO
EXIT CRITICAL REGION A
406
LOAD IWTBF LIST
407
EXIT CRITICAL REGION B
408
RETURN
409
REMOVE A PAGE FROM THE IWTBF LIST
410
IS THE PAGE'S R BIT SET
411
YES
NO
SET THE PAGE'S V BIT
412
IS THE PAGE'S M BIT SET
413
NO
YES
PLACE THE PAGE ON THE SWAPOUT QUEUE
414
PLACE THE PAGE FRAME FOUND IN THE PT ENTRY IN THE FREE LIST
415

SWAP
600
ENTER CRITICAL REGION A
601
IS SWAPOUT QUEUE EMPTY
602
YES
NO
EXIT CRITICAL REGION A
610
EXIT
611
DIRECT A PAGE FROM THE SWAPOUT QUEUE TO BE SWAPPED OUT ONTO DISK
603
REMOVE THE PAGE FROM THE SWAPOUT QUEUE
604
RESET THE PAGE'S M BIT
605
EXIT CRITICAL REGION A
606
WAIT FOR SWAPPING TO COMPLETE
607
ENTER CRITICAL REGION A
608
PLACE THE PAGE FRAME FOUND IN THE PT ENTRY IN THE FREE LIST
609

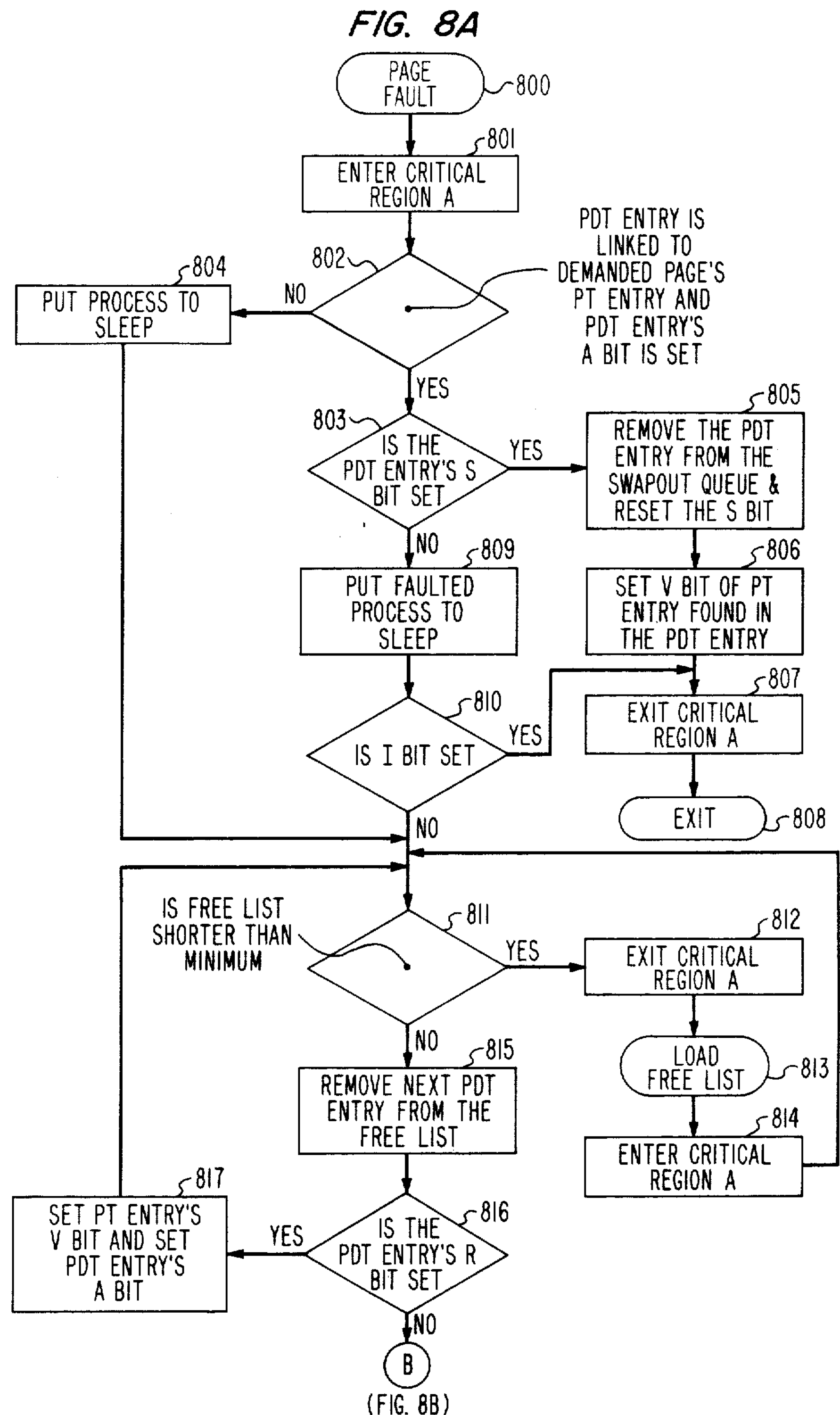
FIG. 8A
PAGE FAULT
800
ENTER CRITICAL REGION A
801
802
PDT ENTRY IS LINKED TO DEMANDED PAGE'S PT ENTRY AND PDT ENTRY'S A BIT IS SET
NO
PUT PROCESS TO SLEEP
804
YES
803
IS THE PDT ENTRY'S S BIT SET
YES
REMOVE THE PDT ENTRY FROM THE SWAPOUT QUEUE & RESET THE S BIT
805
NO
PUT FAULTED PROCESS TO SLEEP
809
SET V BIT OF PT ENTRY FOUND IN THE PDT ENTRY
806
IS I BIT SET
810
YES
EXIT CRITICAL REGION A
807
EXIT
808
NO
IS FREE LIST SHORTER THAN MINIMUM
811
YES
EXIT CRITICAL REGION A
812
LOAD FREE LIST
813
ENTER CRITICAL REGION A
814
NO
REMOVE NEXT PDT ENTRY FROM THE FREE LIST
815
IS THE PDT ENTRY'S R BIT SET
816
YES
SET PT ENTRY'S V BIT AND SET PDT ENTRY'S A BIT
817
NO
B
(FIG. 8B)

B
818
LINK THE PT ENTRY TO THE PDT ENTRY
819
LINK THE PDT ENTRY TO THE PT ENTRY & SET THE PDT ENTRY'S A BIT
820
SET THE PDT ENTRY'S I BIT
821
DIRECT THE DEMANDED PAGE TO BE SWAPPED FROM THE DISK INTO THE PDT ENTRY'S CORRESPONDING PAGE FRAME
822
EXIT CRITICAL REGION A
823
WAIT FOR SWAPPING TO COMPLETE
824
RESET THE PDT ENTRY'S I BIT
825
SET THE PT ENTRY'S V BIT
826
WAKE UP FAULTED PROCESSES
EXIT
827

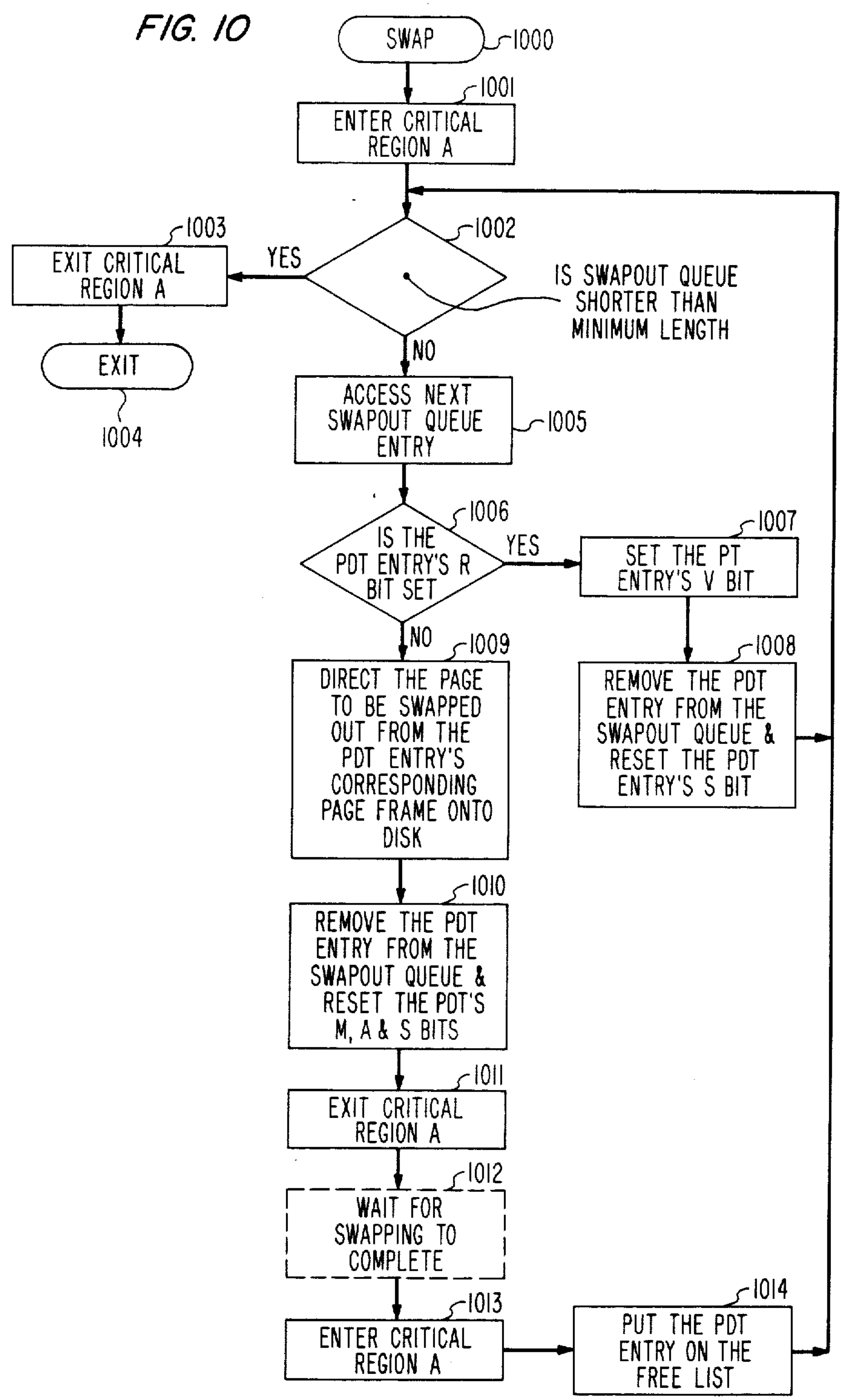
FIG. 10
SWAP
1000
ENTER CRITICAL REGION A
1001
IS SWAPOUT QUEUE SHORTER THAN MINIMUM LENGTH
1002
YES
EXIT CRITICAL REGION A
1003
EXIT
1004
NO
ACCESS NEXT SWAPOUT QUEUE ENTRY
1005
IS THE PDT ENTRY'S R BIT SET
1006
YES
SET THE PT ENTRY'S V BIT
1007
REMOVE THE PDT ENTRY FROM THE SWAPOUT QUEUE & RESET THE PDT ENTRY'S S BIT
1008
NO
DIRECT THE PAGE TO BE SWAPPED OUT FROM THE PDT ENTRY'S CORRESPONDING PAGE FRAME ONTO DISK
1009
REMOVE THE PDT ENTRY FROM THE SWAPOUT QUEUE & RESET THE PDT'S M, A & S BITS
1010
EXIT CRITICAL REGION A
1011
WAIT FOR SWAPPING TO COMPLETE
1012
ENTER CRITICAL REGION A
1013
PUT THE PDT ENTRY ON THE FREE LIST
1014

DEMAND PAGING SCHEME FOR A MULTI-ATB SHARED MEMORY PROCESSING SYSTEM

TECHNICAL FIELD

This invention relates to memory management of processing systems in general, and to paging schemes of shared memory multiple address translation buffer processing systems in particular.

BACKGROUND OF THE INVENTION

In a virtual memory system, programs and data are assigned virtual, or logical, addresses, and system users reference the virtual addresses rather than addresses in a physical memory. A significant advantage of a virtual memory processing system is that the virtual, or logical, address space which is available for use by system users may differ from the actual physical space of the processing system's main memory. In such a processing system only a portion of the virtual memory may reside in the physical main memory at any one time, while the remainder may reside in bulk secondary storage. To make the entire virtual memory selectively accessible in main memory, provision must be made for swapping, or transferring, portions of the virtual memory from secondary storage into the physical main memory and from the main memory back into secondary storage as dictated by the demands of system use.

For purposes of memory management, including swapping, the virtual memory is commonly divided into blocks of equal size, called pages, and portions of virtual memory are swapped into and out of main memory in units of one or more pages. The main memory is in turn divided into page frames, each being a hardware component into which a virtual page may be copied. Whenever information contained in a virtual page which is not in main memory is needed, the page is brought in from secondary storage and is stored in a page frame. The number of page frames is limited, however. If all page frames are occupied and yet another page is needed, a page frame is selected and cleared of the page that currently occupies it and the demanded page is transferred into the cleared page frame.

A virtual memory computing system includes a mechanism for translating virtual addresses into corresponding physical, main memory addresses which are utilized by the processor. The translating mechanism commonly includes an address translation buffer (ATB), which is a relatively small and fast memory used for storing selected virtual addresses and the corresponding main memory addresses that were obtained as a result of previous address translations. Since retrieving the result of a previous translation from the ATB is faster than repeating the translation with the translating mechanism, the use of an ATB speeds up the process of accessing items in memory.

The entries of the ATB are generally valid only for the current virtual memory contents of the main memory, to which the main memory address entries of all of the ATBs refer. Hence whenever the virtual memory contents of the main memory are changed by a page swap, ATB entries which are affected by the swap must be flushed. As used herein, "flushing" of a storage element refers to removing, invalidating, clearing, or otherwise destroying the current contents of the storage element.

A processing system has a plurality of processes executing on one or more processors. For example, a number of processes may execute on a single processor on a time shared basis. And a number of processes may execute concurrently, one on each processor of a multiprocessor system. The processes share use of the main memory of the processing system. Such a system may include a plurality of address translation buffers for use by the plurality of processes. Whenever a process causes a page to be swapped into or out of the shared main memory in such a system, care must be taken that entries of all ATBs that are affected by the swap be invalidated. Otherwise another process, unaware of the swap, may utilize an entry of an ATB to access the wrong page of virtual memory, with consequent erroneous results.

The prior art has approached the problem of keeping the plurality of ATB's updated in such systems in a variety of ways. One approach has been to cause the process which initiated the swap to cause a processor to access all ATBs in the system and invalidate therein the entries affected by the swap. However, the overhead involved in searching for and invalidating affected entries in all ATBs adversely impacts system performance. Moreover, the difficulties, expense, and overhead involved in enabling a plurality of processors in a multiprocessor system to access each ATB, and in synchronizing these accesses such that they may be performed in a mutually non-interfering manner, has been great.

Another approach has been for a process which initiated the swap to inform, for example by means of an interrupt, the other processes of the swap so that they could each have the entries of their own ATBs modified accordingly. However, the overhead involved in informing each process not only of the fact that a swap had taken place but also of which pages were affected thereby and in having to search through plural ATBs to find and invalidate the affected entries is so significant as potentially to make paging an unattractive feature in such a system.

A further problem associated with both of the above approaches of the prior art is that of determining whether a page in physical memory that is shared by two or more processes is currently in use by a process, and of preventing another process from having the page swapped out while it is in use. Prior art schemes, such as associating with each page a counter that is incremented each time a page is used by a process, and decremented each time the page ceases to be used by a process, have not been satisfactory, primarily because of the overhead involved in maintaining and in querying such a counter. Moreover, a shared page can be at different virtual addresses in different processes and consequently may correspond to a different entry in each ATB. Substantial difficulty and overhead is involved in determining, or keeping track of, plural identities of a shared page.

Yet another approach taken by the prior art has been to restrict the pages that a process may swap. For example, a process may be restricted to swapping out only those pages that it already owns, i.e., it may remove from physical memory only those pages that it has placed therein, and it may not swap out pages which it shares with other processes. These restrictions are severe in terms of limiting optimal use of the physical memory, and they tend to destroy the concept of shared memory and the benefits derived therefrom.

SUMMARY OF THE INVENTION

It is these and other disadvantages of the prior art that the invention is directed toward solving.

The invention comprises a novel paging scheme for a processing system which uses a plurality of address translation stores to indicate correspondence between virtual memory and main store addresses. According to this invention, one or more main store page frames are sequestered, and indication begins to be kept of whether the plurality of address translation stores have been flushed since the page frames were sequestered. At some point in time preferably independent of the sequestering and independent of completion of execution in the processing system at sequestering, those address translation stores that are indicated not to have been flushed get flushed. When the address translation stores have been flushed, a page of virtual memory is stored in a page frame selected from the sequestered page frames.

In the context of this application, a page frame is sequestered when an associated arrangement for keeping track of whether the address translation buffers may possibly contain a valid entry pointing to this page frame is initialized, i.e., directed to begin keeping track of this possibility.

According to a first aspect of the invention, sequestering involves preventing the address translation stores from storing the main store address of the one or more page frames.

According to a second aspect of the invention, sequestering involves initializing an arrangement for signaling that an address translation store may have stored the main store address of the one or more page frames. A sequestered page frame whose address may have been stored by an address translation store is then not selected to store a page.

The inventive paging scheme has numerous advantages over the prior art. For example, it does not place restrictions on the types of pages that a process may swap: a process may swap pages owned by itself or by other processes, as well as shared pages. The scheme does not necessarily require the association of counters or other special structures with shared pages, and the upkeep thereof. Nor do plural identities of shared pages need be kept track of. Furthermore, the scheme produces little overhead. It does not require the ATBs to be accessed and modified each time a page is swapped from main memory. And the paging scheme generally will have to induce the flushing of ATBs only very infrequently, because generally individual ATBs are flushed at various points of system operation as part of the conventional operational scheme of the processing system.

These and other advantages and features of the present invention will become apparent from the following description of the illustrative embodiments of the invention, taken together with the drawing.

BRIEF DESCRIPTION OF THE DRAWING

FIGS. 2–6 are diagrams of a first illustrative embodiment of a demand paging scheme of FIG. 1, wherein;

FIG. 2 is a block diagram of data structures of the scheme,

FIGS. 3A–B are logical flow diagrams of page fault processing portions of the demand paging program of the scheme, FIGS. 4A–B are logical flow diagrams of list maintenance and loading portions of the paging program, FIG. 5 is a logical flow diagram of a list loading portion of the paging program, and FIG. 6 is a logical flow diagram of a swap portion of the demand paging program; and FIGS. 7–10 are diagrams of a second illustrative embodiment of the demand paging scheme of FIG. 1, wherein FIG. 7 is a block diagram of data structures of the scheme, FIGS. 8A–B are logical flow diagrams of page fault processing portions of the demand paging program of the scheme, FIG. 9 is a logical flow diagram of a list loading portion of the paging program, and FIG. 10 is a logical flow diagram of a swap portion of the demand paging program.

DETAILED DESCRIPTION

Figure 1:
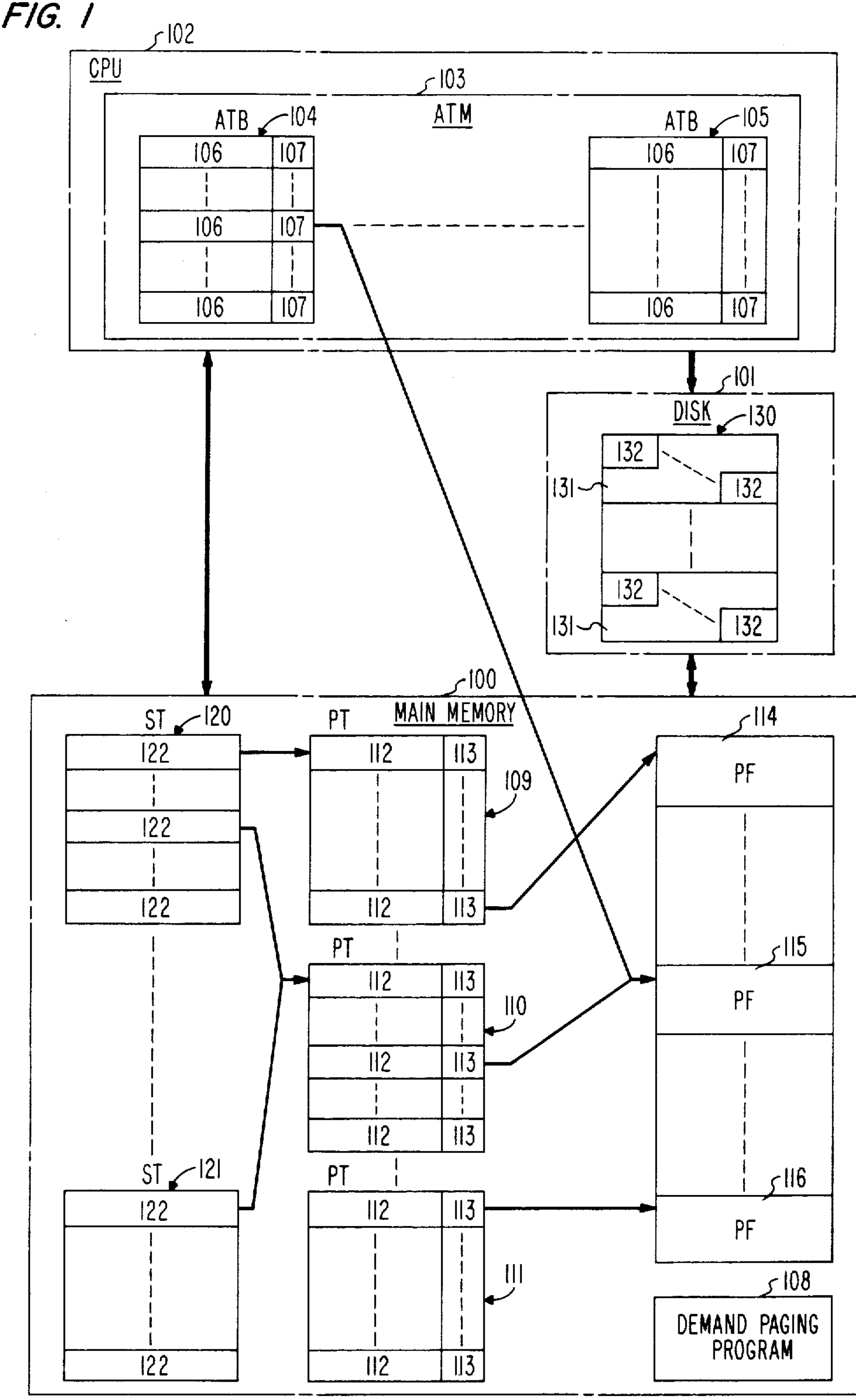
FIG. 1 is a block diagram of a paged virtual memory processing system.

Relevant portions of a paged virtual memory processing system for which the illustrative embodiment of the invention is intended are diagramed in block form in FIG. 1. Such a system may be any convenient processing system which uses a plurality of address translation stores, in conjunction with a virtual storage addressing scheme and a shared main store, to indicate correspondence between virtual and shared main store addresses. The illustrative system of FIG. 1 comprises primary physical memory referred to as a main memory 100, bulk secondary storage such as a disk 101, and at least one central processing unit (CPU) 102.

The virtual memory space is symbolically represented in FIG. 1 and designated by the numeral 130. Information contained in the virtual memory space 130, for example data and instructions, are stored on the disk 101 and are selectively brought into the main memory 100 under control of the CPU 102. While for ease of illustration the virtual memory space is shown as directly corresponding to the address space of the disk 101, it should be noted that the inventive scheme is equally applicable to virtual memory schemes that are not so restricted. The relationship between the virtual memory space and the disk 101 address space is not a part of the invention.

The CPU 102 accesses memory locations of the main memory 100 to retrieve therefrom and to store therein words of information. Again, for illustrative purposes, a processing system having a single CPU 102 is shown. The invention is likewise applicable to a processing system having plural CPUs 102. In a processing system which includes a plurality of CPUs 102, the CPUs 102 share use of the main memory 100.

A plurality of processes execute on each CPU 102 in a time shared manner. Processes are programmed jobs or tasks that are submitted to the processing system for execution. The plurality of processes share use of the main memory 100. A process provides virtual addresses to the CPU 102. An address translation mechanism (ATM) 103 of the CPU 102 translates in a known manner the virtual address of some unit of information into a main memory, or physical, address of the location in the main memory 100 where the unit of information may be found, provided that the unit of information is indeed stored in the main memory 100.

The virtual memory address space 130 is divided into one or more blocks of addresses referred to as segments 131. The segments 131 are subdivided into subblocks of addresses, referred to as pages 132. The segments 131 may be of variable size. Each segment 131 comprises one or more pages 132. Virtual memory address space 130 is assigned for use to processes on a persegment basis. Each process has associated therewith one of a plurality of segment tables (STs) 120-121 which are located in the main memory 100. Each of the segment tables 120-121 contains one or more entries 122, each of which corresponds to a segment 131 that is assigned to, or "owned" by, the associated process. In turn, each segment table entry 122 has associated therewith one of a plurality of page tables (PTs) 109-111 which are likewise located in the main memory 100. Each of the page tables 109-111 contains a plurality of entries 112, each of which corresponds to a page 132 of virtual memory 130 that is included in the associated segment 131. A segment table entry 122 points to, i.e., contains the main memory address at which may be found, the associated one of the page tables 109-111. Thus in the example of FIG. 1, the process associated with the segment table 120 owns the pages 132 that are associated with the page tables 109 and 110 because the segment table 120 includes one entry 122 that points to the page table 109 and another entry that points to the page table 110.

In the illustrative example of FIG. 1, two or more processes share pages 132 on a per-segment 131 basis. Processes that share a segment 131 each have a segment table entry 122 which points to the same page table. The pages 132 corresponding to that page table are shared. For example, in FIG. 1, the segment tables 120 and 121 both have entries 122 pointing to the page table 110 and hence processes which are associated with the segment tables 120 and 121 share the pages 132 which are associated with the page table 110. While processes are shown to share pages 132 on a per-segment 131 basis in this example, other schemes for sharing pages, such as on a per-page 132 basis, are also known to the art. The invention applies to such schemes as well.

The main memory 100 includes a plurality of page frames (PFs) 114-116 each of which is a block of memory locations of the main memory 100 that are used to store a page 132 of information when the page 132 is swapped, or transferred, into the main memory 100 from the disk 101. An entry 112 of one or more page tables 109-111 points to, i.e., contains the main memory 100 address of, the first main memory 100 storage location of the one of the page frames 114-116, if any, in which the page 132 corresponding to that entry 112 is stored. In the example of FIG. 1, an entry 112 of the page table 109 points to the page frame 114, an entry 112 of the page table 110 points to the page frame 115, and an entry 112 of the page table 111 points to the page frame 116. A single page table entry 112 may comprise one or more words of the memory 100.

For indicating whether the page 132 associated with a page table entry 112 is stored in one of the page frames 114-116 of the main memory 100, and whether the entry 112 is valid, i.e., not outdated and available for use in address translation, each page table entry 112 has associated therewith a validity bit 113. To allow the validity bit 113 to be accessed and its value to be selectively changed by a CPU 102 independently of another CPU 102 simultaneously accessing and changing the associated entry 112, the bit 113 may be implemented in a byte or a word of the memory 100.

In translating a virtual address that has been supplied to the CPU 102 by the currently executing process, the ATM 103 first selects the one of the segment tables 120-121 that is associated with the currently executing process and accesses therein an entry 122 which is specified by the virtual address that is being translated. The accessed entry 122 points the ATM 103 to the one of the page tables 109-111 that is associated with that entry 122, and the ATM 103 accesses in that one of the page tables 109-111 an entry 112 which is likewise specified by the virtual address that is being translated. If the validity bit 113 of the accessed page table entry 112 is in the valid state, the accessed entry 112 provides the ATM 103 with the address of one of the page frames 114-116 of the main memory 100 in which the associated page 132 is stored. Upon finding in the valid state the validity bit 113 of a selected page table entry 112, the ATM 103 can return the page frame address contained in that page table entry 112 to the CPU 102 to complete the address translation process, because a particular word of the page 132, and hence a corresponding memory location of the one of the page frames 114-116, is specified by the virtual address that is being translated.

Results of selected translations are stored for reuse by an executing process in one of a plurality of address translation buffer memories (ATBs) 104-105 which are included in the ATM 103. Each ATB 104-105 includes a plurality of storage locations, or entries 106, each for storing a main memory address obtained as a result of translating a virtual address. For example, in FIG. 1 an entry 106 of the ATB 104 contains the address of, or points to, the page frame 115 in the main memory 100. Each ATB entry 106 also specifies, either directly or indirectly, the virtual address that corresponds to the stored main memory address. During address translation, the specified virtual address must be matched with the virtual address that is being translated before the stored main memory address may be retrieved from the ATB entry 106.

In a processing system having one CPU 102, a plurality of ATBs 104-105 are included in the ATM 103. In a processing system having plural CPUs 102, the ATM 103 of each CPU 102 includes at least one ATB of the ATBs 104-105.

The number of ATBs 104-105 in the processing system is limited and generally is small in comparison to the number of processes needing to use them. Hence a plurality of processes must utilize one or more of the ATBs 104-105 in succession. When the CPU 102 switches from execution of one process to the execution of another process, it clears, or flushes, one of its associated ATBs 104-105 of information stored therein by a previously executing process, thus protecting the information stored in the main memory 100 which belongs to the previously executing process from being accessed by the newly executing process, and also freeing the one of the ATBs 104-105 for use by the newly executing process. The CPU 102 flushes one of the ATBs 104-105 by setting to an invalid state all of the ATB's validity bits 107, one of which is associated with each entry 106 of each of the ATBs 104-105.

Before translating a virtual address, the ATM 103 first checks the contents of one of the ATBs 104-105 which is being used by the currently executing process, to determine if an entry 106 containing the result of a like prior translation can be found there. If such an entry 106 having its associated validity bit 107 set to the valid state can be found, the ATM 103 returns the contents of the entry 106 to the CPU 102 as the desired main memory page address.

If the translation result cannot be found in the one of the ATBs 104–105, or if an entry 106 containing the result is found but its corresponding validity bit 107 is in the invalid state, the ATM 103 must perform the requested address translation by accessing the segment tables 120–121 and the page tables 109–111, as was described above. Upon completing the translation, the ATM 103 may store the result in the one of the ATBs 104–105 which is being utilized by the currently executing process.

When an executing process requires the CPU 102 to access a word of information which word is in a virtual memory page 132 that is not currently accessible in a page frame 114–116 of the main memory 100, the ATM 103 finds the page table entry 112 corresponding to that virtual page 132 to have its validity bit 113 set to the invalid state. Therefore the ATM 103 generates a page fault interrupt signal.

The page fault interrupt signal causes the CPU 102 to execute a demand paging program 108 which is, for example, stored in a portion of the main memory 100. The function of the demand paging program 108 is to make the requested information available to the process in the main memory 100. To do so, generally the demand paging program must select one of the page frames 114–116 and cause it to be loaded from the disk 101 with the demanded page 132. The demand paging program 108 also adjusts the contents of the page table entries 112 and their validity bits 113 to reflect the new state, i.e., changed contents, of the main memory 100. Paging programs and supporting data structures are known to the art and therefore the details thereof will not be discussed here. Only the modifications thereof required to implement a first and a second illustrative embodiment of the invention will be discussed in any detail.

Figure 2:
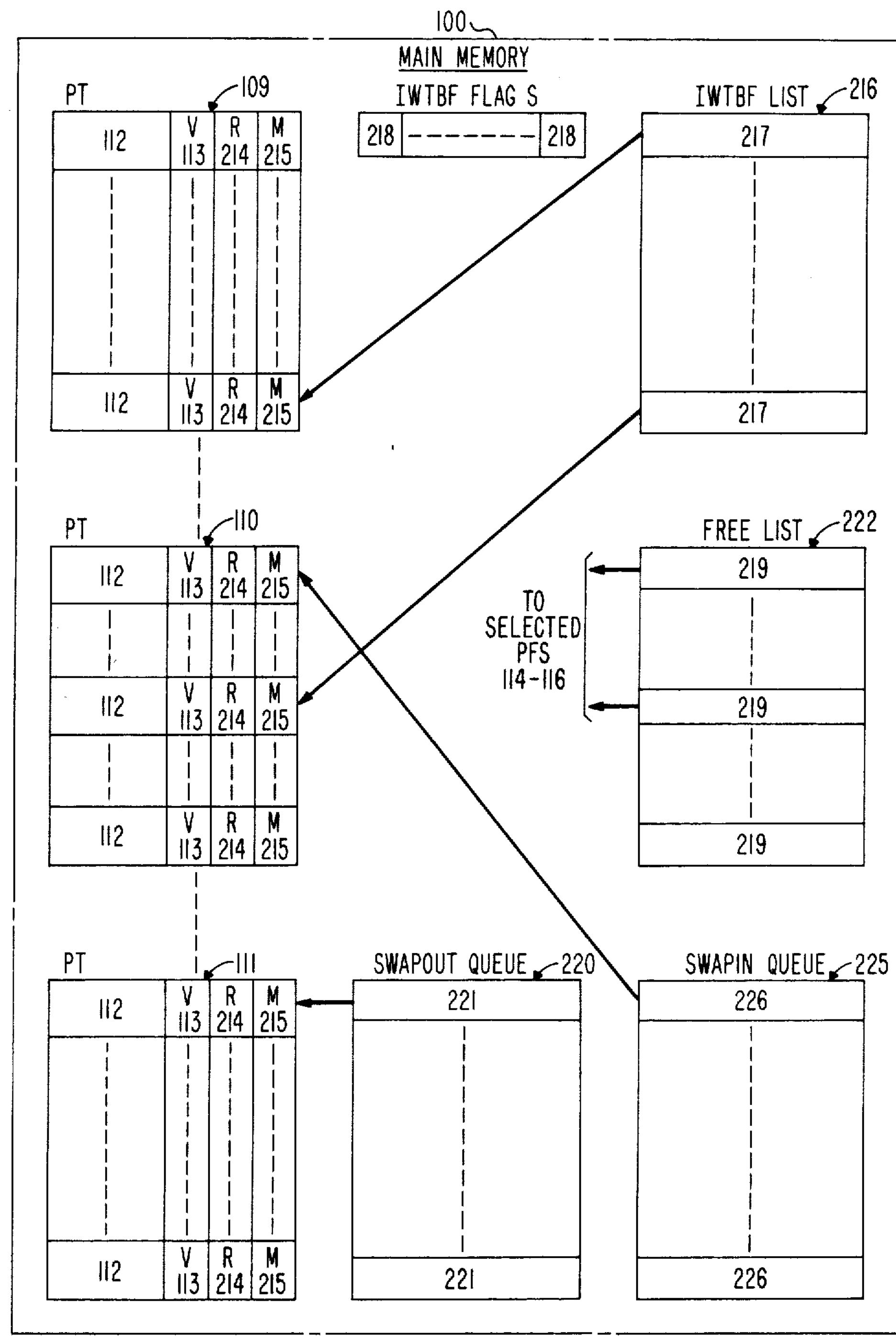

A first embodiment of a demand paging program and supporting structures is diagramed in FIGS. 2–6. FIG. 2 shows data structures which are included in the main memory 100. Structures shown in FIG. 2 which have already been discussed and shown in FIG. 1 are designated in FIG. 2 by the same numerals as in FIG. 1.

As shown in FIG. 2, each entry 112 of the page tables 109–111 has associated therewith three bits, designated as the referenced (R) bit 214, the modified (M) bit 215, and the validity (V) bit 113. As in the case of the validity bit 113, which was discussed previously, to allow either of the R bit 214 or the M bit 215 to be accessed and its value to be selectively changed by a CPU 102 independently of another CPU 102 simultaneously accessing and changing the other bits associated with an entry 112, or the entry 112 itself, the bits 214 and 215 may each be implemented in a byte or a word of the memory 100. The referenced bit 214 of a page table entry 112 is set by the ATM 103 when the one of the page frames 114–116 that corresponds to that entry 112 is first caused to be accessed, or referenced, by an executing process. Thus the referenced bit 214 indicates recent usage, or lack thereof, of the associated page 132. The modified bit 215 of a page table entry 112 is likewise set when the one of the page frames 114–116 that corresponds to that entry 112 is first caused to be changed by an executing process. Thus the modified bit 214 indicates whether information contained in the associated page 132 has remained unchanged or has been modified while the page 132 has been residing in the main memory 100.

The main memory 100 also includes an "I want to be free" (IWTBF) list 216 which has a plurality of entries 217 for storing pointers to, i.e., addresses of, page table entries 112 whose associated pages 132 are being readied for removal from page frames 114–116 of the main memory 100. Each entry 217 may comprise one or more words of the memory 100. The list 216 may take any convenient form; for example, it may be a linked list of selected entries 112 of the page tables 109–111, or it may be a table as shown in FIG. 2. Associated with the IWTBF list 216 is a group of IWTBF flags 218. Each flag 218 corresponds to one of the ATBs 104–105. All of the flags 218 are reset, or cleared, when the IWTBF list 216 is loaded with page frame addresses. A flag 218 is set when the associated one of the ATBs 104–105 is flushed, of cleared of its contents. When all of the flags 218 are set, it is an indication that all of the ATBs 104–105 have been flushed since the IWTBF list 216 was loaded. To allow any one of the flags 218 to be independently accessed and its value to be changed without affecting the remaining flags 218, each flag 218 may be implemented in a byte or a word of the memory 100.

The main memory 100 further includes a free list 222 which has a plurality of entries 219 for storing pointers to page frames 114–116 which are free to be loaded with a page 132 from the disk 101. Each entry 219 may comprise one or more words of the memory 100. As in the case of the IWTBF list 216, the free list 222 may take on any convenient form, but is shown as a table in FIG. 2.

The main memory 100 also includes a swapout queue 220 which has a plurality of entries 221 for storing, inter alia, pointers to page table entries 112 whose associated pages 132 have been modified while residing in page frames 114–116 of the main memory 100, and which therefore must be swapped out, written, onto the disk 101 before being overwritten with a new pages 132 being swapped in from the disk 101. The entries 221 commonly also contain the disk 101 addresses of the associated pages 132. Again, an entry 221 may comprise one or more words of the memory 100, and the swapout queue 220 may take on any convenient form, but is shown as a table in FIG. 2.

Lastly, the main memory 100 includes a swapin queue 225 having a plurality of entries 226 for storing pointers to page table entries 112 whose associated pages 132 are in the process of being swapped into the main memory 100 from the disk 101. The entries 226 indicate whether the demand paging program need not be executed in response to particular page fault interrupts because the demanded pages 132 are already being swapped in, in response to a previous demand made by other processes. The entries 226 likewise commonly contain the disk 101 addresses of the associated pages 132. An entry 226 may comprise one or more words of the memory 100, and the swapin queue 225 may take on any convenient form but is shown as a table in FIG. 2.

In a processing system having more than one CPU 102, it is advantageous to restrict simultaneous access by more than one CPU 102 to data structures such as the IWTBF list 216, the free list 222, or the swapout queue 220, in order to assure that the CPUs 102 use these data structures in a mutually non-interfering manner. For this purpose semaphores (not shown) may be implemented around each of the data structures. The concept, structure, and use of semaphores are well known in the art. Alternatively, semaphores may be placed around critical, i.e., possibly mutually interfering, portions of the paging program to assure that at any one time a critical portion of the paging program can execute on only one CPU 102 in the processing system. The critical regions of the paging program are indicated in the flow diagrams of FIGS. 3–6.

The use of the above-described data structures will now be elaborated upon in conjunction with a description of the demand paging program logic flow diagrams of FIGS. 3–6.

Figure 3A:
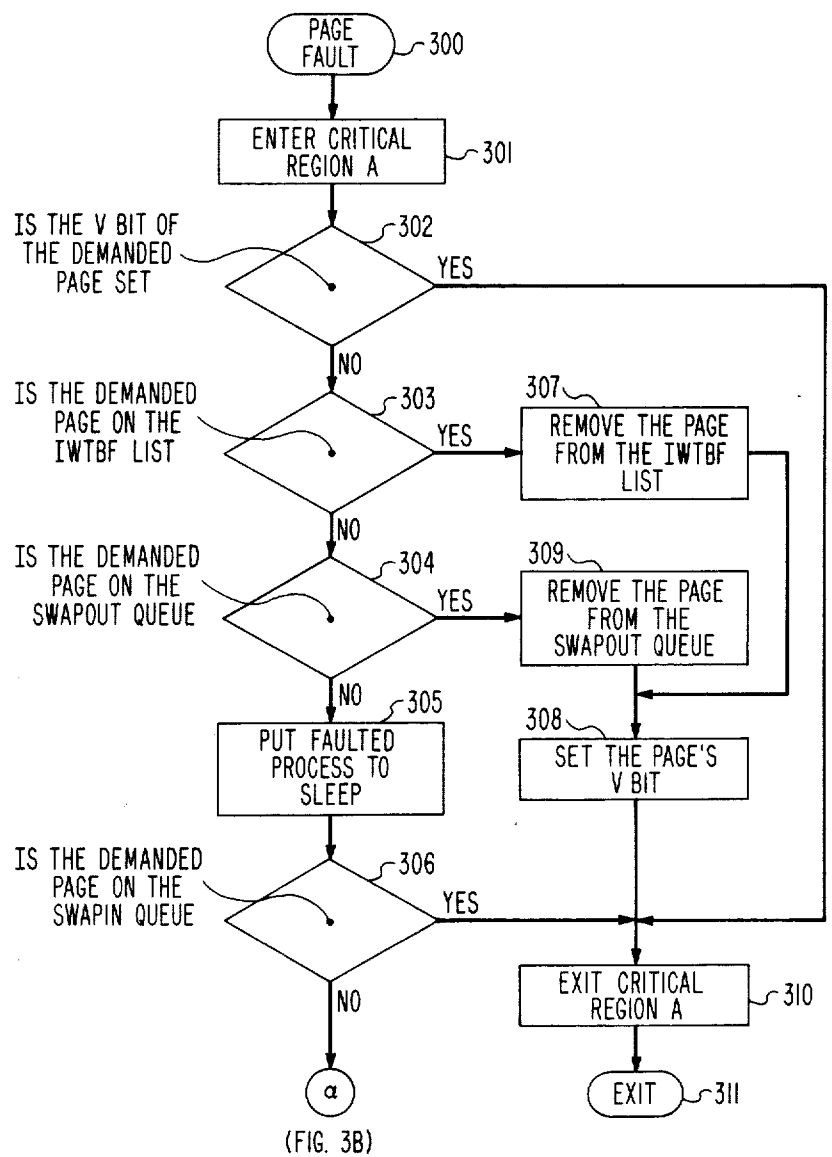

As indicated in FIG. 3A by block 300 and mentioned above, execution of the demand paging program is begun by the CPU 102 in response to the appearance of a page fault interrupt. As shown in block 301, the CPU 102 enters a first critical region, designated as A, of the demand paging program. As shown in block 302, the CPU 102 then accesses the page table entry 112 which is associated with the demanded page 132 to determine whether its validity bit 113 has been set to the valid state since the ATM 103 which generated the page fault interrupt found it invalid.

If the V bit 113 is set, indicating that the demanded page 132 is now available in the main memory 100, the CPU 102 exits the critical region A, as shown in block 310, and then the CPU 102 exits the demand paging program, as indicated in block 311. If the V bit 113 is found to be reset to the invalid state in the block 302, the CPU 102 checks whether the page table entry 112 of the demanded page 132 is pointed to by an entry 217 of the IWTBF list 216, as suggested in block 303.

If the page table entry 112 of the demanded page 132 is pointed to by an entry 217 of the IWTBF list 216, the CPU 102 removes that page table entry 112 from the IWTBF list 216, as indicated in block 307. The CPU 102 then sets to the valid state the validity bit 113 of the PT entry 112, as shown in the block 308. The demanded page 132 is thus made available in the main memory 100 to the ATM 103, and the CPU 102 exits the critical region A of the demand paging program and the program itself, as indicated in the blocks 310 and 311, respectively.

If the page's page table entry 112 is not pointed to by an entry 217 of the IWTBF list 216, as determined in the block 303, the CPU 102 checks the swapout queue 220 for an entry 221 pointing to that page table entry 112, as shown in block 304. If the page table entry 112 of the demanded page 132 is pointed to by an entry 221 of the swapout queue 220, the CPU 102 removes that page table entry 112 from the swapout queue 220, as indicated in block 309. The CPU 102 then proceeds with program execution to the block 308 to complete making the demanded page 132 available in the main memory 100.

If the demanded page's page table entry 112 is not pointed to by an entry 221 of the swapout queue 220, as determined in the block 304, the demanded page 132 must be brought into the main memory 100 from the disk 101. As shown in block 305, the CPU 102 puts the process that is demanding the page 132 "to sleep", i.e., prevents it from being scheduled to execute further, until the page requested by that process will be made accessible thereto in the main memory 100. The CPU 102 then checks the swapin queue 225 for an entry 226 pointing to the page table entry 112 of the demanded page 132, as shown in block 306. If such an entry 226 exists, it is an indication that the demanded page 132 is already being swapped into the main memory 100 in response to a previous demand made by another process. The demand paging program therefore need not be executed further in response to the page fault interrupt currently being processed. The CPU 102 therefore exits the critical region A and the demand paging program itself, as indicated in the blocks 310 and 311, respectively.

If the demanded page's page table entry 112 is not pointed to by an entry 226 of the swapin queue 225, as determined in the block 306, the CPU 102 must obtain from the free list 222 the address of a page frame 114–116 into which it can swap the demanded page 132, and therefore the CPU 102 accesses the free list 222 and checks whether the list 222 is empty, as shown in block 312 of FIG. 3B. If the list 222 is not empty, i.e., points to one or more page frames 114–116, the CPU 102 continues program execution at block 316. If the list 222 is empty, the CPU 102 exits the program critical region A, as indicated in the block 313, and then executes the load free list routine of FIG. 4B, as shown in block 314. Following execution of the load free list routine, the CPU 102 reenters critical region A, as shown in block 315, and returns demand paging program execution to the block 312.

As suggested in block 316, the CPU 102 removes the pointer to a page frame 114–116 from the free list 222. The CPU 102 then calls upon the disk 101 to transfer the demanded page 132 into that page frame 114–116, as shown in block 317. A pointer to, i.e., the main memory address of, the page frame 114–116 is then stored by the CPU 102 in the PT entry 112 of the demanded page 132, as indicated in block 318. And a pointer to that PT entry 112 is placed by the CPU 102 in an entry 226 of the swapin queue 225, as indicated in block 319. The CPU 102 may also place in that swapin queue entry 226 the disk 101 address of the demanded page 132.

At this point the CPU 102 exits the critical region A of the demand paging program, as indicated by block 320. The CPU 102 must wait with further execution of the demand paging program while the disk 101 is performing the requested transfer, as shown in block 321. It is assumed througout the discussion that read and write operations on any storage location in the disk 101 are performed by the disk 101 in the order in which they are received. While the disk 101 is performing the requested transfer, the CPU 102 may leave the demand paging program and undertake other activities, such as the execution of other processes. After the disk 101 has completed the transfer, the CPU 102 returns to the execution of the demand paging program and reenters the critical region A thereof, as shown in block 322. The CPU 102 accesses the swapin queue 225 and removes therefrom the pointer to the PT entry 112 of the demanded page 132, as indicated in block 323. The CPU 102 then accesses the PT entry 112 of the demanded page 132 and resets the associated R bit 214 and M bit 215 to initialize them. Also, the CPU 102 sets the validity bit 113 of that page table entry 112, all as shown in block 324, to indicate that the demanded page 132 is stored in the main memory 100 and that the page table entry 112 therefor is valid. The CPU 102 then "wakes up" the processes that were interrupted by page fault interrupts caused by this page 132, as indicated in block 325, by enabling the processes to be scheduled for execution again. At this point the CPU 102 exits the critical region A of the paging program, as indicated by block 326. And as shown in block 327, the CPU 102 then exits the paging program itself.

To avoid running out of page frames 114–116 that are available for having demanded pages 132 swapped into them, periodically the CPU 102 is called upon to maintain the free list 222, by performing the routine flowcharted in FIG. 4A. The CPU 102 is directed to execute the routine of FIG. 4A via a timed entry such as a periodic interrupt. Following the receipt of a directive to execute the free list maintenance routine, as indicated in block 450 of FIG. 4A, the CPU 102 checks the free list 222, as shown in block 451, to determine whether it is below a predetermined minimum in length, i.e., whether it contains fewer than some predetermined number of page frame addresses. The predetermined number may, for example, strike a balance between the costs, in terms of system efficiency, of the free list 222 being found empty by the paging program as a result of the number of free pages being too small, and of underutilization of available memory as a result of the number of free pages being too large. If the free list 222 is of sufficient length, the CPU 102 exits the free list maintenance routine, as shown by block 453. If the free list 222 is not of sufficient length, the CPU 102 executes the load free list routine of FIG. 4A, as indicated by block 452, before exiting the free list maintenance routine at the block 453.

The logical flow diagram of the load free list routine of the demand paging program appears in FIG. 4B. As indicated in block 400, the load free list routine is executed by the CPU 102 upon encountering ,the load free list condition, at the block 314 of FIG. 3B and the block 452 of FIG. 4A. As shown in block 401, the CPU 102 first enters a critical region B of the demand paging program, to assure that only one CPU 102 is executing the load free list routine at any one time. The CPU 102 then enters the critical region A of the demand paging program, as indicated in block 402. The CPU 102 then examines the IWTBF flags 218, as indicated in block 403, to determine whether all ATBs 104–105 have been flushed since the IWTBF list 216 was last loaded. If all of the IWTBF flags 218 are not set, indicating that all ATBs 104–105 have not been flushed, the CPU 102 flushes the unflushed ones of the ATBs 104–105, as shown in block 404. The CPU 102 then continues program execution at block 405. If all of the IWTBF flags 218 are found to be set in the block 403, indicating that all ATBs 104–105 have been flushed, the CPU 102 proceeds with program execution directly at the block 405.

Flushing of all of the ATBs 104–105 since the IWTBF list 216 was loaded guarantees that no ATB 104–105 contains a valid entry 106, i.e., an entry 106 having its associated validity bit 107 set to the valid state, created before the loading of the IWTBF list 216, which entry 106 points to the page frames 114–116 whose addresses are in the IWTBF list 216. A further mechanism, described in conjunction with block 504 of FIG. 5, guarantees that no such ATB entries 106 have been created since the loading of the IWTBF list 216. Therefore the group of page frames 114–116 which are pointed to by the entries 217 of the IWTBF list 216 may be swapped out of the main memory 100, and the CPU 102 undertakes to transfer the addresses of selected of those page frames 114–116 from the IWTBF list 216 to the free list 222.

As indicated in block 405, the CPU 112 checks whether the IWTBF list 216 is empty, i.e., whether or not it contains pointers to any PT entries 112. If the list 216 is empty, the CPU 102 exits the critical region A of the program, as shown in block 406, and then proceeds to execute the load IWTBF list routine, as shown in block 407, the logical flow of which routine is diagramed in FIG. 5. Thereafter the CPU 102 exits the critical region B of the program, as shown in block 408, and returns program execution to the point from which the load free list routine was called, as indicated in block 409.

If the list 216 is not found to be empty in the block 405, the CPU 102 removes a pointer to a PT entry 112 from the IWTBF list 216, as indicated in block 410. The CPU 102 accesses that PT entry 112 and checks the referenced bit 214 of that entry 112 to determine if the bit 214 is set, as shown in block 411. If the referenced bit 214 is set, indicating that the page 132 associated with that PT entry 112 was being referenced at the time of loading of the IWTBF list 216, there is a likelihood that the same page 132 will be referenced again in the near future. Hence, this page 132 should not be swapped out of the main memory 100, and the CPU 102 sets the validity bit 113 of this page table entry 112 to valid, as shown in block 412, to make the PT entry 112 available for use by the ATM 103. The CPU 102 then returns to the block 405.

If the referenced bit 214 of the page table entry 112 is not found to be set in the block 411, the CPU 102 proceeds to check the modified bit 215 of that PT entry 112, as shown in block 413. If the modified bit 215 is set, indicating that the page 132 associated with that PT entry 112 was modified while the page 132 was residing in the main memory 100, the page 132 must be swapped back onto the disk 101 before it can be destroyed in the main memory 100. Therefore the CPU 102 places a pointer to the page's associated PT entry 112 in an entry 221 of the swapout queue 220, as suggested in block 414. The CPU 102 then returns to the block 405.

If the modified bit 215 of the page table entry 112 is not found to be set in the block 413, the CPU 102 proceeds to transfer the address of the page frame 114–116 that is contained by that entry 112 to the free list 222, as indicated in block 415. The CPU 102 then returns program execution to the block 405.

Figure 5:
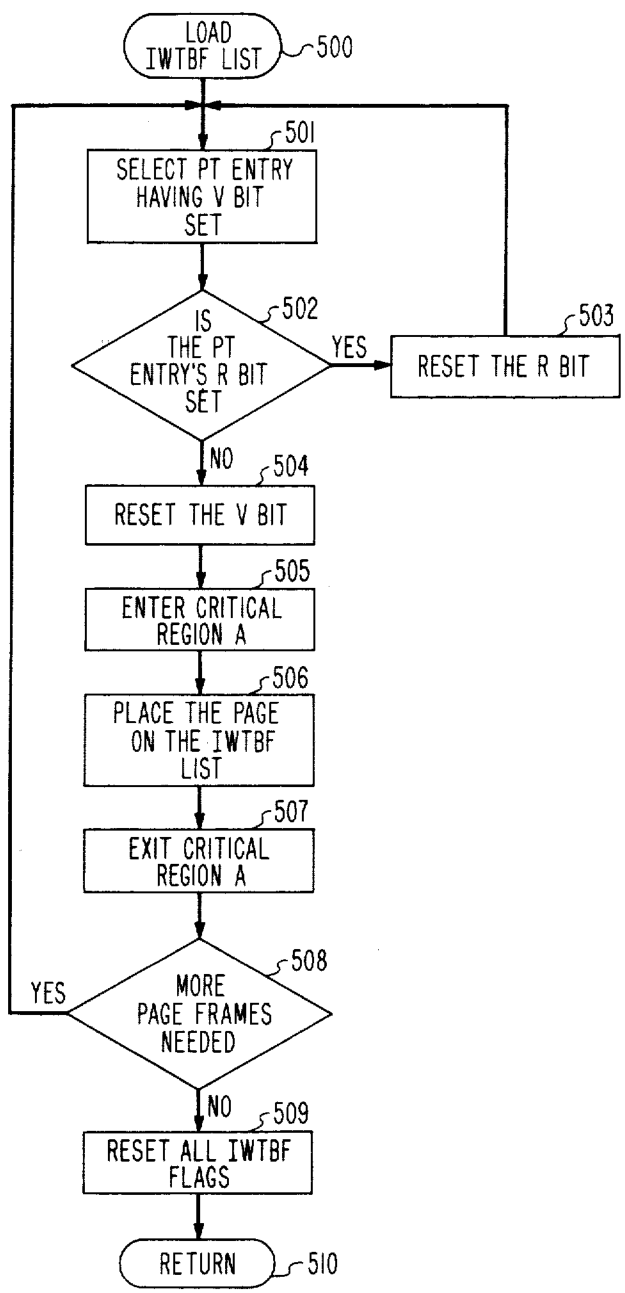

The logical flow diagram of the load IWTBF list routine is presented in FIG. 5. As shown in block 500, this routine is executed by the CPU 102 when it encounters the load IWTBF list condition, upon finding the IWTBF list empty in block 407 of FIG. 4B. As shown in block 501, the CPU 102 selects an entry 112 from the page tables 109–111 whose associated validity bit 113 is set to the valid state. Selection of a page table entry 112 may be made according to any suitable criterion, for example by a sequential search through the page tables 109–111. The valid state of the validity bit 113 indicates that the associated entry 112 corresponds to a page 132 which is currently residing in the main memory 100 and which page 132 is not currently on the IWTBF list 216. The CPU 102 then checks the referenced bit 214 of the selected entry 112, as indicated in block 502. If the referenced bit 214 is set, indicating that the associated page 132 has recently been referenced, there is a likelihood that the same page 132 will be referenced again in the near future. Hence this page 132 should not be swapped out of the main memory 100. Therefore the CPU 102 resets the referenced bit 214 of the selected entry 112, as shown in block 503, and returns to the block 501 to select another page table entry 112.

If the referenced bit 214 of the selected page table entry 112 is found to be reset in the block 502, the CPU 102 proceeds to sequester the page frame 114–116 which is pointed to by the selected page table entry 112. In the context of the illustrative embodiments of this application, sequestering of a page frame 114–116 includes initializing an associated arrangement for keeping track of whether the ATBs 104–105 have been flushed. In these embodiments, the arrangement includes the IWTBF flags 218. The arrangement may be permanently associated with a particular one or more page frames 114–116, as will be seen is the case of the embodiment of FIGS. 7–10, or sequestering may include temporarily associating the arrangement with a particular one or more page frames 114–116, as will be seen is the case of the embodiment of FIGS. 2–6. In these embodiments, track must also be kept of whether or not valid ATB entries 106, i.e., ATB entries 106 marked with valid validity bits 107, pointing to the one or more page frames 114–116 that are being sequestered may have been made subsequent to the initialization of the IWTBF flags 218. This latter function of keeping track of the possible creation of such ATB entries 106 after a point in time complements the former function of keeping track of the possible existence of such ATB entries 106 created before that point in time, which former function is performed by the IWTBF flags 218. When the latter function indicates that no such ATB entries 106 have been created since the point in time, and the former function indicates that no such ATB entries 106 created before the point in time exist, the contents of the sequestered page frame may be removed from the main memory 100.

In the example of FIGS. 2–6, the possible creation of an ATB entry 106 pointing to the sequestered page frame 114–116 is kept track of by the expedient of preventing such an entry 106 from being made. For this purpose, the CPU 102 resets to the invalid state the validity bit 113 of the page table entry 112 which points to the sequestered page frame 114–116, as shown in block 504. The invalid state of the validity bit 113 indicates to the ATM 103 that the associated page 132 is considered to not be present in the main memory 100, and thus assures that the ATM 103 will not henceforth create an entry 106 in any of the ATBs 104–105 based on the contents of the selected page table entry 112. The CPU 102 then enters the critical program region A, as indicated in the block 505, and loads an entry 217 of the IWTBF list 216 with a pointer to the selected page table entry 112, as indicated in block 506. As the page table entry 112 in turn points to a page frame 114–116, the IWTBF list 216 is the list of the sequestered page frames 114–116.

The CPU 102 then exits the critical program region A, as indicated in block 507, and checks the length of the IWTBF list 216 to determine whether the IWTBF list 216 is of adequate length, or whether more page frames 114–116 need be added to those already contained in the IWTBF list 216, as suggested by block 508. The adequacy of the length of the IWTBF list 216 may again be dictated by considerations of system efficiency such as striking a balance between more frequent calls to the load IWTBF list routine when the length of the list 216 is kept short and more frequent calls to the demand paging program, due to underutilization of available memory, when the length of the list 216 is kept long. If the IWTBF list 216 is not sufficiently full, the CPU 102 returns program execution to the block 501 to select yet another page table entry 112. If the IWTBF list 216 is full, the CPU 102 completes page frame sequestering by clearing all of the IWTBF flags 218, as shown in block 509, to initialize them for keeping track of which ATBs 104–105 are henceforth flushed. Program execution is then returned to the point from which the load IWTBF list routine was called, as shown in block 510.

Figure 6:
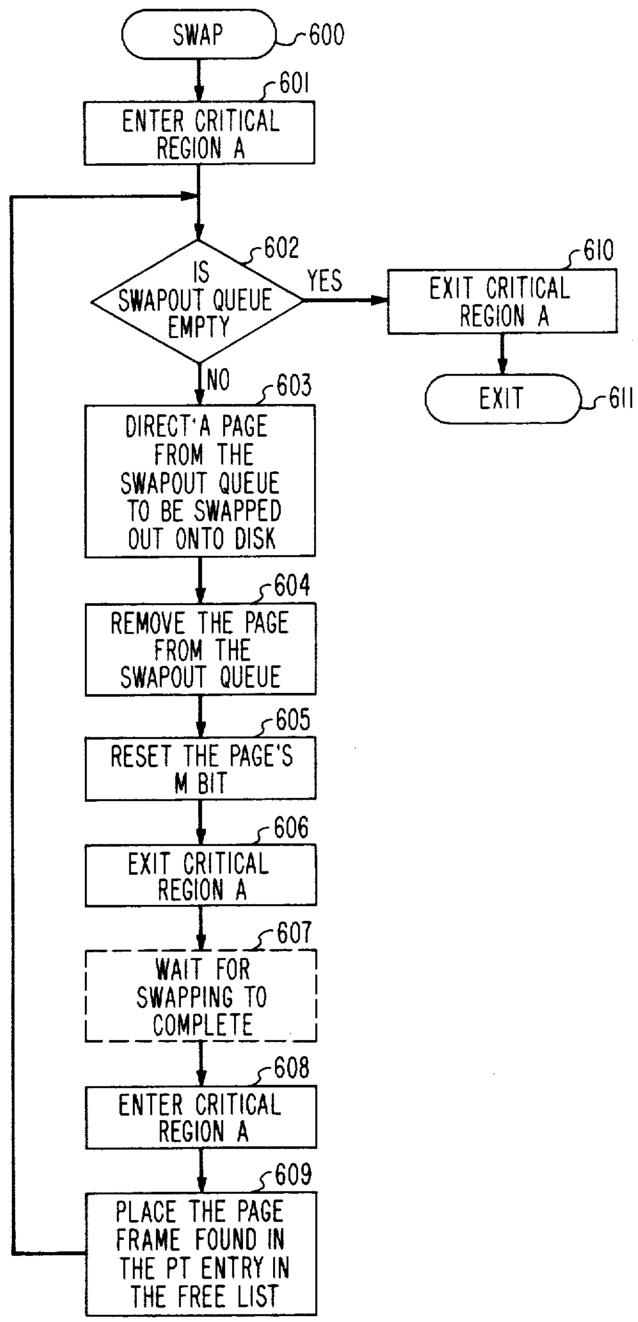

To save on the disk 101 new information contained in modified pages 132, periodically the CPU 102 is caused to execute the swap routine which is flowcharted in FIG. 6. This routine may, for example, be executed every time the CPU 102 exits the load free list routine of FIG. 4B, or upon the encounter of a timed entry such as a periodic interrupt. As shown in block 600 of FIG. 6, the CPU 102 executes the swap routine when it is given the swap directive. The CPU 102 enters the critical program region A, as shown in block 601, and checks the swapout queue 220 to determine whether the queue 220 is empty, as indicated in block 602. If the queue 220 is empty, the CPU 102 exits the critical program region A, as indicated by block 610, and then exits the swap routine itself, as indicated in block 611. If the swapout queue 220 is not empty, the CPU 102 accesses an entry 221 of the swapout queue 220 and directs an input/output arrangement, for example the disk 101, to write onto the disk 101 the contents of, i.e., the page 132 which is occupying, a page frame 114–116 addressed by a PT entry 112 pointed to by that swapout queue entry 221, as shown in block 603. The version of the page 132 that is stored in the main memory 100 replaces on the disk 101 the former version of that page 132. As suggested in block 604, the CPU 102 then removes the pointer to the swapped out page's PT entry 112 from the swapout queue 220. And the CPU 102 resets the M bit 215 associated with that PT entry 112, as indicated in block 605.

At this point the CPU 102 exits the critical program region A, as indicated by block 606. The CPU 102 must wait with further execution of the swap routine while the input/output arrangement is performing the swap, as shown in block 607. During this time the CPU 102 may leave the swap routine and undertake other activities. After the swap has been completed, the CPU 102 returns to the execution of the swap routine and enters the critical region A thereof, as shown in block 608. The CPU 102 appends a pointer to the page frame 114–116 that held the swapped out page 132 to the free list 222, as shown in block 609, and returns to the block 602. When the CPU 102 finds the swapout queue 220 to be empty in the block 602, it exits the swap routine at the block 611.

Figure 7:
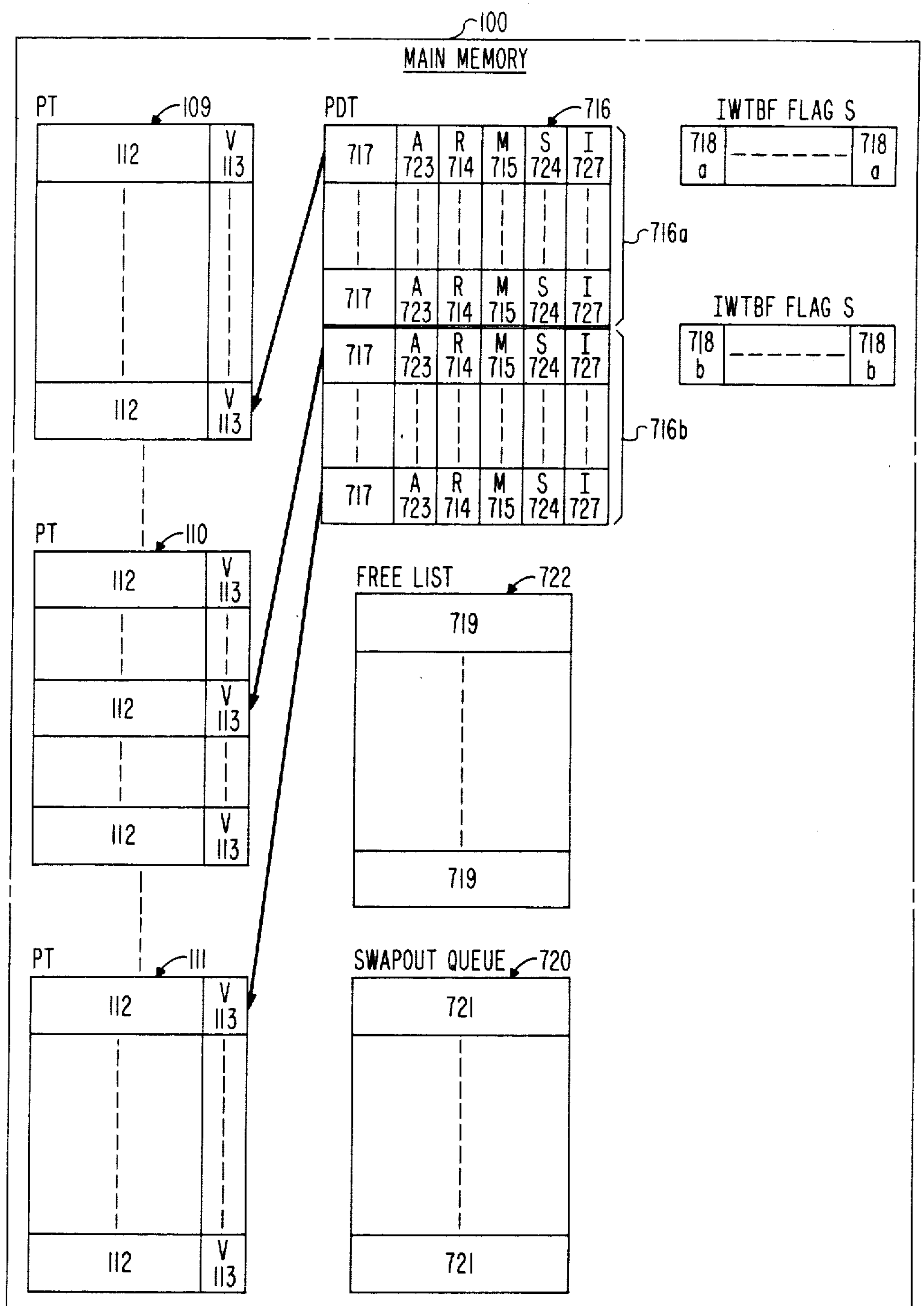
Figure 8B:
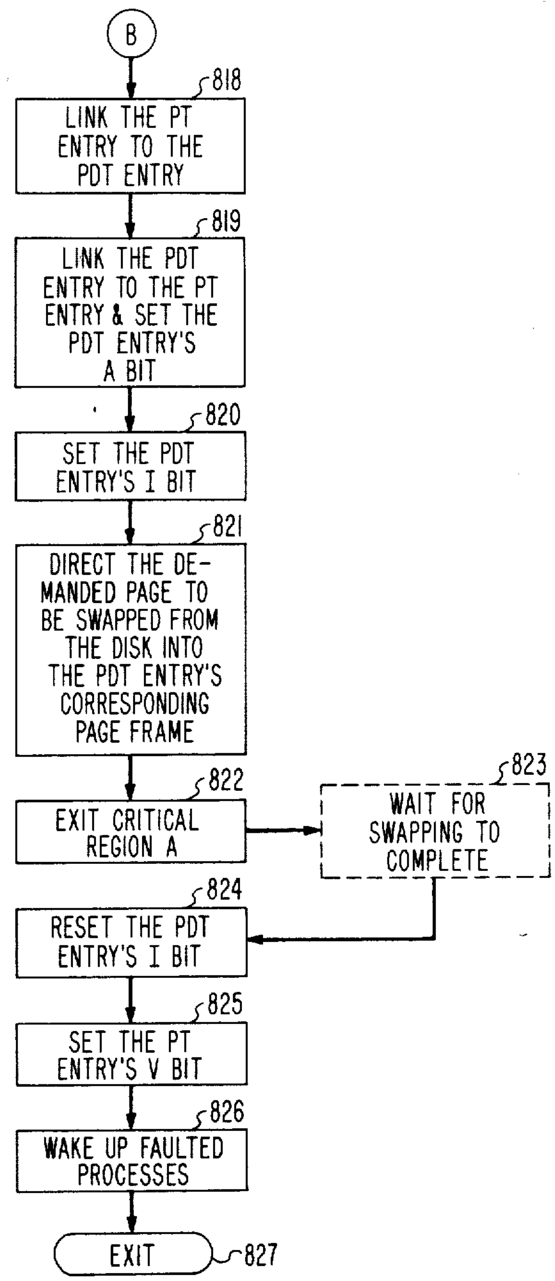

A second embodiment of a demand paging program and supporting structures is diagramed in FIGS. 7–10. FIG. 7 shows data structures which are included in the main memory 100. Structures shown in FIG. 7 which have already been discussed and shown in FIG. 1 are designated in FIG. 7 by the same numerals as in FIG. 1.

As shown in FIG. 7, the main memory 100 includes a free list 722 having a plurality of entries 719, and a swapout queue 720 having a plurality of entries 721. The functions of these structures are the same as those of the like structures 222, 219, 220 and 221, respectively, of FIG. 2. Each of the entries 719 and 721 may likewise include one or more words of the memory 100. The free list 722 and the swapout queue 720 may take any convenient form. For example, each may be a linked list of selected entries 717 of a page data table (PDT) 716, or each may be a table of such entries 717, as shown in the example of FIG. 7.

The main memory 100 also includes the page data table (PDT) 716 which contains a plurality of entries 717, each one of which is associated with one of the page frames 114–116 and contains information describing the associated one of the page frames 114–116. An entry 717 points to, i.e., contains the address of, a page table entry 112 which is associated with the page 132, if any, that is stored in the page frame 114–116 to which the entry 717 corresponds. Each entry 717 may likewise comprise one or more words of the memory 100. Each entry 717 of the PDT 716 has associated therewith a plurality of status-indicating bits, designated as allocated (A) bit 723, referenced (R) bit 714, modified (M) bit 715, swapout (S) bit 724, and swapin (I) bit 727. The state of the allocated bit 723 indicates whether the corresponding page frame 114–116 is occupied, i.e., whether it has been allocated to hold a page 132. The functions of the referenced bit 714 and of the modified bit 715 are like the functions of the like bits 214 and 215 of FIG. 2. The state of the swapout bit 724 indicates whether the corresponding PDT entry 717 is appended to the swapout queue 720. And the state of the swapin bit 727 indicates whether the corresponding PDT entry 717 is in the process of being swapped into the main memory 100 from the disk 101. As in the case of the validity bit 113, to allow any one or more of the bits 723, 714, 715, 724, and 727 to be independently accessed and their values to be selectively changed by a CPU 102 independently of another CPU 102 simultaneously accessing the remaining bits associated with an entry 717, or the entry 717 itself, the bits 723, 714, 715, 724, and 727 may each be implemented in a byte or a word of the memory 100.

The PDT 716 is divided into a plurality of partitions, i.e., the entries 717 of the PDT 716 are separated into a plurality of distinct groups. In the example of FIG. 7, the PDT 716 is shown as being divided into two partitions 716*a* and 716*b*. Each PDT partition 716*a* and 716*b* has a group of "I want to be free" (IWTBF) flags 718 associated therewith. In the example of FIG. 7, the PDT partition 716*a* has a group of flags 718*a* associated therewith while the PDT partition 716*b* has a group of flags 718*b* associated therewith. For purposes of independent access, each flag 718 may again comprise a byte or a word of the main memory 100. A flag 718 of each of the pluralities of flags 718*a* and 718*b* corresponds with one of the ATBs 104–105. Thus each of the pluralities of flags 718*a* and 718*b* has a flag 718 for each one of the ATBs 104–105. Fla9s 718*a* and 718*b* which are associated with a particular one of the ATBs 104–105 are set when that particular one of the ATBs 104–105 is flushed. The plurality of flags 718*a* or 718*b* associated with a PDT partition 716*a* or 716*b* are cleared when the paging program of FIG. 8 "exits" i.e., completes a search through, that PDT partition 716*a* or 716*b*, as will be made clear in conjunction with an explanation of FIG. 8. When all of the flags 718 of a plurality of flags 718*a* or 718*b* are set, it is an indication that all of the ATBs 104–105 have been flushed since the paging program of FIG. 8 exited the associated PDT partition 716*a* or 716*b*.

As in the case of the embodiment of FIGS. 2–6, semaphores (not shown) may advantageously be implemented in a known manner around data structures such as the PDT 716, the free list 722, and the swapout queue 720, or around critical portions of the paging program, in a processing system having a plurality of CPUs 102. The critical regions of the paging program are indicated in the flow diagrams of FIGS. 8–10.

Figure 9:
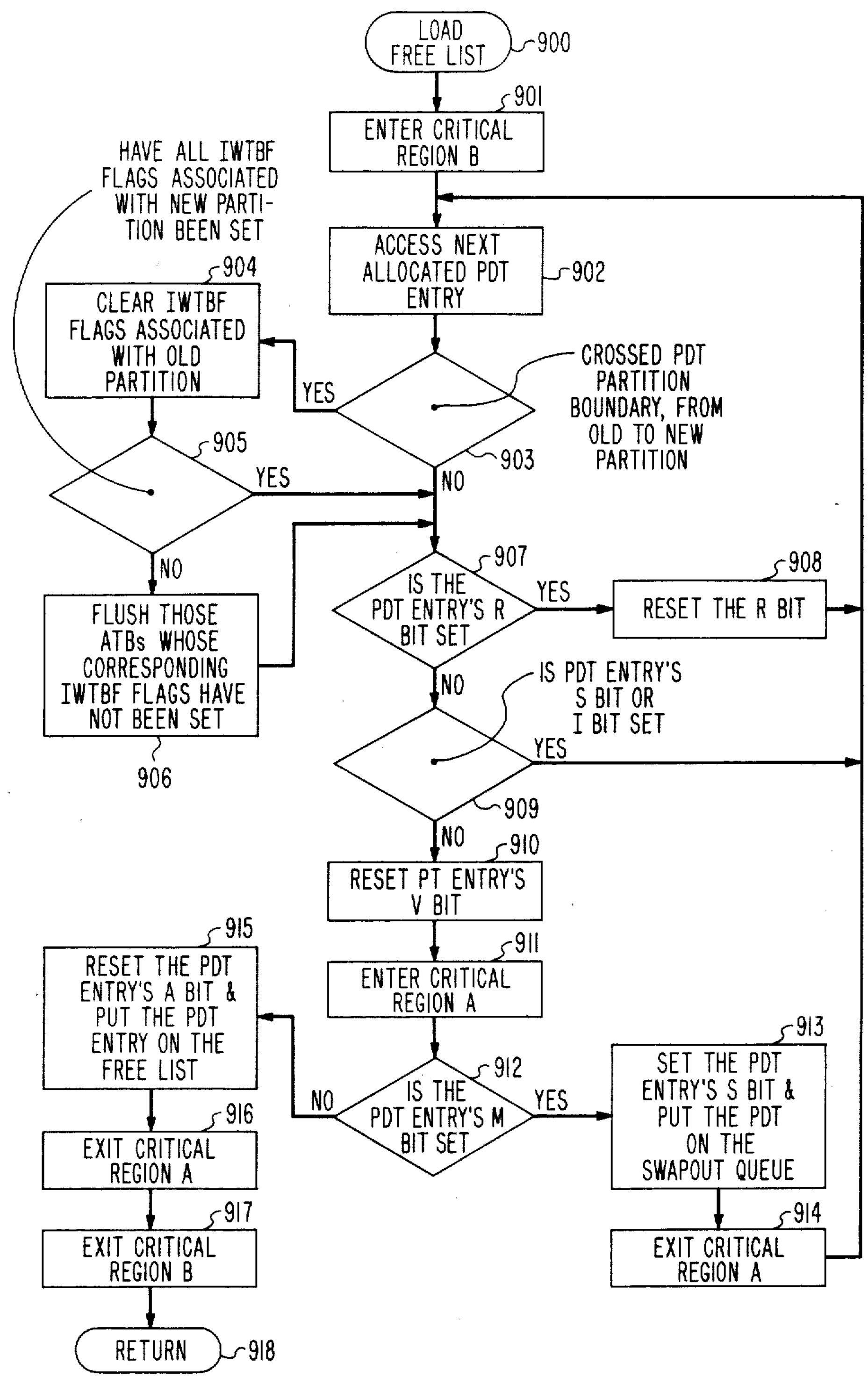

The use of the above-described data structures will now be elaborated upon in conjunction with a description of the demand paging program logical flow diagrams of FIGS. 8–10.

As indicated in FIG. 8A by block 800, execution of the demand paging program is begun by the CPU 102 in response to the appearance of a page fault interrupt. As shown in block 801, the CPU 102 first enters the critical region A of the demand paging program. The CPU 102 then accesses the PT entry 112 associated with the demanded page to obtain a pointer, if one exists, to a PDT entry 717, and accesses that PDT entry 717 to determine if it points back to the PT entry 112 of the demanded page 132, as suggested in block 802. If such an entry 717 is found, the CPU 102 checks the A bit 723 of that entry 717 to determine if it is set, also as indicated in block 802. If both conditions are not met, it is an indication that the demanded page 132 must be retrieved from the disk 101. The CPU 102 therefore "puts to sleep" the process that is demanding that page 132, as indicated in block 804, and proceeds with program execution to block 811.

If both conditions are met at the block 802 by a PDT entry 717, it is an indication that the demanded page 132 is stored in the page frame 114–116 corresponding to that PDT entry 717, even though the page 132 is considered to be unavailable in the main memory 100. The CPU 102 checks the S bit 724 of the PDT entry 717, as indicated in block 803. If the S bit 724 is set, indicating that the PDT entry 717 is linked to the swapout queue 720, the CPU 102 unlinks that PDT entry 717 from the swapout queue 720 and resets the S bit 724, as shown in block 805. The CPU 102 the sets to the valid state the validity bit 113 of the PT entry 112 pointed to by the PDT entry 717, to make the demanded page 132 available for access in the memory 100. The CPU 102 then exits the critical program region A, as indicated in block 807, and thereafter exits the demand paging program itself, as indicated in block 808.

If the S bit 724 of the PDT entry 717 examined in the block 803 is not set, the CPU 102 "puts to sleep" the process that is demanding the page 132, as indicated in block 809. The CPU 102 then checks the swapin bit 727 of the PDT entry 717, as indicated in block 810. If the swapin bit 727 is set, indicating that the demanded page 132 is already being swapped into the main memory 100 in response to a previous demand made by another processor, the CPU 102 exits the critical program region A and then exits the paging program itself, as shown in the blocks 807 and 808, respectively. If the swapin bit 727 of the PDT entry 717 is not found to be set in the block 810, the CPU 102 proceeds with demand paging program execution at the block 811.

As was mentioned above, the CPU 102 may reach program execution at the block 811 from either the block 804 or the block 810, in order to obtain the demanded page 132 from the disk 101. The CPU 102 must obtain from the free list 722 the address of a page frame 114–116 into which the demanded page 132 can be swapped. The CPU 102 accesses the free list 722 and checks whether the free list 722 is shorter than some predetermined minimum length, as indicated in block 811. Advantageously, the minimum length of the free list 722 is such that the minimum time required for a complete turnover of entries in the free list 722 exceeds the maximum time required by a CPU 102 to perform a memory 100 access cycle, including address translation and updating of the PDT 716.

The free list 722 includes all unallocated page frames 114–116, i.e., all page frames 114–116 whose corresponding allocated bits 723 in the PDT 716 have not been set. When there are a sufficient number of unallocated page frames 114–116, the CPU 102 finds the free list 722 to be of sufficient length at the block 811, and it continues program execution at block 815. But when unallocated page frames 114–116 are nearly exhausted, the CPU 102 finds the free list 722 to be of insufficient length at the block 811, and the CPU 102 must execute the load free list routine of FIG. 9, as indicated in block 813. Before executing the load free list routine, the CPU 102 exits the critical program region A, as shown in block 812. After executing the load free list routine, the CPU 102 reenters the critical region A, as shown in block 814, and then returns program execution to the block 811 to recheck the adequacy of the length of the free list 722.

As suggested by the block 815, upon finding the free list 722 to be of sufficient length at the block 811, the CPU 102 removes the next sequential entry 719 from the free list 722. The free list 722 is organized as a first-in first-out memory, and the CPU 102 removes the oldest entry 719, for example the bottom entry from the free list 722. The free list entry 719 points to a PDT entry 717, and the CPU 102 accesses the PDT entry 717 to determine if the referenced bit 714 of the entry 717 is set, as indicated in block 816. If the referenced bit 714 is set, it indicates that the page 132 allocated to the page frame 114–116 corresponding to that PDT entry 717 was being referenced at the time the PDT entry 717 was being added to the free list 722 by the load free list routine of FIG. 9. There is a likelihood that the same page 132 will be referenced again in the near future. Also, the reference to that page 132 which resulted in the referenced bit 714 being set may have been preceded by an address translation that created an ATB entry 106 pointing to the page frame 114–116 which holds the referenced page 132. Hence, this page 132 should not be swapped out of the main memory 100, and the CPU 102 restores to the valid state the validity bit 113 of the page table entry 112 which is pointed to by the PDT entry 717, as shown in block 817. The CPU 102 also sets the allocated bit 723 of the PDT entry 717. The CPU 102 then returns program execution to the block 811.

If the referenced bit 714 of the PDT entry 717 is not found to be set in the block 810, it is guaranteed that no ATB 104–105 contains a valid entry 106 pointing to the page frame 114–116 associated with that PDT entry 717, as will be shown below. That page frame 114–116 is therefore free to hold the demanded page 132 that is being swapped in from the disk 101. As suggested in block 818 of FIG. 8B, the CPU 102 therefore causes the PT entry 112 of the demanded page 132 to point to the PDT entry 717 of the free page frame 114–116. As indicated in block 819, the CPU 102 also causes that PDT entry 717 to point back to the PT entry 112 of the demanded page 132, and sets the A bit 723 of the PDT entry 717 to indicate that the corresponding page frame 114–116 is allocated to a page 132. The CPU 102 also sets the I bit 727 of that PDT entry 717, as indicated in block 820, to indicate that a page 132 is being swapped into the page frame 114–116 associated with the PDT entry 717.

The various linkages being accomplished, the CPU 102 calls upon the disk 101 to swap the demanded page 132 from the disk 101 into the free page frame 114–116, as indicated in block 821. At this point the CPU 102 exits the critical region A of the demand paging program, as indicated by block 822. The CPU 102 must wait with further execution of the demand paging program while the disk 101 is performing the requested transfer, as shown in block 823. As was mentioned previously, it is assumed throughout this discussion that read and write operations on any storage location of the disk 101 are performed in the order in which they are requested of the disk 101. While the disk 101 is performing the requested transfer, the CPU 102 may leave execution of the demand paging program and undertake other activities. After the disk 101 has completed the transfer, the CPU 102 returns to the execution of the paging program. The CPU 102 resets the PDT entry's I bit 727, as indicated in block 824. The CPU 102 then accesses the valid bit 113 of the PT entry 112 pointed to by the PDT entry 717 and sets the V bit 113 to the valid state, as indicated in block 725.

Having completed the paging mission, the CPU 102 "wakes up" the processes that were interrupted by page fault interrupts caused by this page 132, as shown in block 726, enabling the processes to be scheduled for execution again. The CPU 102 then exits the demand paging program, as shown in block 827.

As was mentioned above, the logical flow diagram of the load free list routine of the demand paging program is shown in FIG. 9. As indicated in block 900, the load free list routine is executed by the CPU 102 upon encountering the load free list condition at the block 813 of FIG. 8A. The CPU 102 searches for a page frame 114–116 that is swappable out of the main memory 100. The CPU 102 first enters the critical program region B, as indicated in block 901. The CPU 102 then selects and accesses a PDT entry 717 whose A bit 723 is set, as shown in block 902. The CPU 102 accesses the PDT entries 717 in sequence, and it accesses the next sequential PDT entry 717 whose allocated bit 723 is set. Having accessed the PDT entry 717, the CPU 102 checks whether in the process it has crossed a PDT partition boundary, as indicated in block 903, either from the partition **716*a* to the partition 716*b*, or from the last entry 717 of the partition 716*b* back to the first entry 717 of the partition 716*a***.

The crossing of the boundary of the PDT partition 716 marks the sequestering of the page frames 114–116 associated with the exited one of the PDT partitions **716*a* and 716*b*. As was explained previously, sequestering of a page frame 114–116 includes initializing an associated group of IWTBF flags 718 to begin keeping track of whether the ATBs 104–105 have been flushed. This former function of the IWTBF flags 718 is once again complemented by the latter function of keeping track of whether or not valid ATB entries 106 pointing to the page frames 114–116 that are being sequestered are made subsequent to the initialization of the associated group of IWTBF flags 718. In the illustrative embodiment of FIGS. 7–10, this latter function is performed for a sequestered page frame 114–116 by the associated referenced bit 714**, as will be made clear below.

If a partition boundary has been crossed, the CPU 102 clears the IWTBF flags 718 of the one of the groups of flags **718*a* and 718*b* which are associated with the "exited" one of the PDT partitions 716*a* and 716*b*, as shown in block 904, to initialize that group of flags 718 for keeping track of which ATBs 104–105 are henceforth flushed. The CPU 102 then checks the flags 718 of the other of the group of IWTBF flags 718*a* and 718*b* which are associated with the "entered" one of the PDT partitions 716a and 716b, as indicated in block 905. For example, if the search for an allocated PDT entry 717 has led the CPU 102 to exit the PDT partition 716a and to enter the PDT partition 716b, the CPU 102 clears the flags 718a and checks the state of the flags 718b. If, on the other hand, the PDT partition 716a has just been entered, the CPU 102 clears the flags 718b and checks the state of the flags 718a**.

The CPU 102 checks the flags 718 that are associated with the newly "entered" partition 716a or 716b to determine whether all ATBs 104–105 have been flushed at least once since the CPU 102 last exited that partition 716a or 716b. If all of the checked flags 718a or 718b are not set, indicating that all ATBs 104–105 have not been flushed since that partition 716 was exited, the CPU 102 flushes ones the unflushed of the ATBs 104–105, as suggested in block 906. The CPU 102 is then allowed to continue program execution at block 907. If all of the checked flags 718a or 718b are found to be set in the block 905, indicating that all ATBs 104–105 have been flushed, the CPU 102 is allowed to proceed with program execution directly at the block 907. Flushing of all of the ATBs 104–105 since the newly "entered" partition 716 was last exited guarantees that no ATB 104–105 contain a valid entry 106 created before the CPU 102 last exited the partition 716 and pointing to the page frames 114–116 associated with that partition.

The CPU 102 likewise proceeds with execution to the block 907 directly from the block 903 if it does not find a partition boundary to have been crossed at the block 902.

As was mentioned above, the CPU 102 searches for a page frame 114–116 that may be swappable out of the main memory 100. As indicated by the block 907, the CPU 102 checks the referenced bit 714 of the PDT entry 717 that was accessed in the block 902. If the R bit 714 is set, it indicates that the contents of the page frame 114–116 associated with the PDT entry 717 have been referenced since the CPU 102 last examined this entry 717. There is a likelihood that another reference to the contents of that associated page frame 114–116 may be made soon. Also, a reference to that page frame 114–116 since the CPU 102 last examined this entry 717 may have been preceded by an address translation that created an ATB entry 106 pointing to that page frame 114–116. Hence the current contents of the page frame 114–116 should not be destroyed. Therefore the CPU 102 merely resets the referenced bit 714 of that PDT entry 717, as shown in block 908, to initialize the referenced bit 714 for keeping track anew of references made to the associated page frame 114–116. The CPU 102 then returns program execution to the block 902 to access the next allocated PDT entry 717. Because the CPU 102 accesses the PDT entries 717 in sequence while it is executing the program of FIG. 9, the CPU 102 will not access the the entry 717 whose referenced bit 714 it has just reset until the next time the CPU 102 enters the partition 716 in which that entry 717 lies.

If the referenced bit 714 is found to be not set in the block 907, it means that the corresponding page frame 114–116 has not been referenced since all ATBs 104–105 have been flushed at least once. Hence it indicates that no ATB 104–105 contains a valid entry 106 pointing to this page frame 114–116 and, unless such an entry 106 is currently being formulated, the contents of the page frame 114–116 may be removed from the main memory 100. As shown in block 909, the CPU 102 checks the swapout bit 724 and the swapin bit 727 of the PDT entry 717 corresponding with the page frame 114–116 to determine whether the page 132 held by the page frame 114–116 is in the process of being moved out of or into the main memory 100, respectively. If so, the CPU 102 returns program execution to the block 902 to access the next allocated PDT entry 717. But if the S bit 724 or the I bit 727 is not found to be set in the block 909, the CPU 102 proceeds to remove the page 132 held by the corresponding page frame 114–116 from the main memory 100.

The CPU 102 accesses the page table entry 112 pointed to by the PDT entry 717 and resets the validity bit 113 of that page table entry 112 to the invalid state, as indicated in block 910. The invalid state of the validity bit 113 indicates to the ATM 103 that the associated page 132 is considered to not be present in the main memory 100, and thus assures that the ATM 103 will not henceforth create an entry 106 in any of the ATBs 104–105 based on the contents of the selected page table entry 112. The CPU 102 then enters the critical region A of the program, as shown in block 911. The CPU 102 accesses again the PDT entry 717 and checks the modified bit 715, as indicated in block 912. If the M bit 715 is set, it indicates that the page 132 stored in the page frame 114–116 associated with the entry 717 was modified while the page 132 has been resident in the main memory 100. The page 132 must therefore be swapped back onto the disk 101 before it can be destroyed in the main memory 100. Pursuant to this objective, the CPU 102 sets the swapout bit 724 of the PDT entry 717, to place the PDT entry 717 on the swapout queue 720, as indicated in block 913. The swapout queue 720 is organized as a first-in first-out memory, and the CPU 102 places PDT entries 717 on the queue 720 sequentially, for example, on the top of the queue 720. The CPU 102 then exits the critical region A, as shown in block 914, and returns program execution to block 902 to access the next allocated PDT entry 717.

If the modified bit 715 of the PDT entry 717 is found to be not set in the block 912, the CPU 102 resets the allocated bit 723 of the PDT entry 717, as indicated in in block 915, to indicate that the corresponding page frame 114–116 is free. The CPU 102 then places the PDT entry 717 on the free list 722, also as indicated in block 915. As was indicated in the prior discussion of the block 809, the free list 722 is organized as a first-in first-out memory, and the CPU 102 removes entries 719 sequentially from the free list 722, for example from the bottom. Therefore the CPU 102 links the PDT entry 717 to the top of the free list 722, to make sure that the PDT entries 717 first linked to the free list 722 are the first to be removed from the list 722. The CPU 102 then exits the critical regions A and B of the program, as indicated by blocks 916 and 917, respectively. As shown by block 918, program execution is then returned from the load free list routine of FIG. 9 to the block 813 of FIG. 8A.

To save on the disk 101 new information contained in modified pages 132, periodically the CPU 102 is caused to execute the swap routine which is flowcharted in FIG. 10. This routine may, for example, be executed every time the CPU 102 exits the load free list routine of FIG. 9, or upon the encounter of a periodic interrupt. As shown in block 1000, the CPU 102 executes the swap routine when it is given the swap directive. The CPU 102 enters the critical region A of the program, as indicated by block 1001, and checks the swapout queue 720 to determine whether the queue 720 is shorter than a minimum predetermined length, as indicated in block 1002. Advantageously, the minimum length of the swapout queue 720 is such that the minimum time required for a complete turnover of entries in the swapout queue 720 exceeds the maximum time required by a CPU 102 to perform a memory 100 access cycle, including address translation and updating of the PDT 716.

If the queue 720 is shorter than the minimum length, the CPU 102 exits the critical program region A, as indicated in block 1003, and then the CPU 102 exits the swap routine itself, as indicated in block 1004. If the swapout queue 720 is sufficiently long, the CPU 102 accesses the next sequential swapout queue entry 721, for example the bottom entry 721 of the first-in first-out swapout queue 720, as shown in block 1005, that indicates a page 132 which is to be swapped out from the main memory 100. The entry 721 points to a PDT entry 717, and the CPU 102 accesses the PDT entry 717 to determine if the referenced bit 714 of the entry 717 is set, as indicated in block 1006.

If the referenced bit 714 is found to be set, it indicates that the page 132 allocated to the page frame 114–116 corresponding to that PDT entry 717 has been referenced since the CPU 102 last examined the PDT entry 717. There is therefore a likelihood that the same page 132 may be referenced again in the near future. Also, a reference to that page frame 114–116 since the CPU 102 last examined this entry 717 may have been preceded by an address translation that created an ATB entry 106 pointing to that page frame 114–116. Hence, this page 132 should not be swapped out of the main memory 100 at this time. The CPU 102 accesses the PT entry 112 corresponding to this page 132 and sets the validity bit 113 thereof to the valid state, as indicated in block 1007, thereby making the page 132 available for access in the main memory 100. The CPU 102 then removes the contents of the accessed swapout queue entry 721 from the swapout queue 720 to remove the PDT entry 717 addressed thereby from the queue 720, as indicated in block 1008. The CPU 102 also resets the PDT entry's swapout bit 724, also as shown in block 1008, to signal that the PDT entry 717 is no longer on the queue 720. Program execution then returns to the block 1002.

If the referenced bit 714 of the PDT entry 717 is found to be not set in the block 1006, the CPU 102 directs an input/output arrangement, for example the disk 101, to write onto the disk 101 the contents, i.e., the page 132 which is occupying, the page frame 114–116 corresponding to the PDT entry 717, as shown in block 1009, to replace on the disk 101 the former version of that page 132. The CPU 102 then removes the PDT entry 717 from the swapout queue 720, and resets the PDT entry's A bit 723, M bit 715, and S bit 724, as shown in block 1010.

At this point the CPU 102 exits the critical program region A, as indicated by block 1011. The CPU 102 must wait with further execution of the swap routine while the input/output arrangement is performing the swap, as shown in block 1012. During this time the CPU 102 may leave the swap routine and undertake other activities. After the swap has been completed, the CPU 102 returns to the execution of the swap routine and reenters the critical region A thereof, as shown in block 1013. As indicated in block 1014, the CPU 102 places the PDT entry 717 on the free list 722. Program execution is then returned to the block 1002.

The swap routine is executed by the CPU 102 repeatedly until the swapout queue 720 is found to be shorter than the minimum length at the block 1002, at which time the swap routine is exited at the block 1004.

Of course, various changes and modifications to the illustrative embodiments described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. In a processing system using paged virtual storage addressing and including an addressable main store having a plurality of page frames for storing selected pages of information, and a plurality of flushable address translation stores for storing the main store addresses corresponding to selected virtual storage addresses, a paging apparatus comprising:

intializable first indicating means, cooperative with the address translation stores, for indicating whether the plurality of address translation stores have been flushed since initialization of the first indicating means;

second indicating means, cooperative with the first indicating means and with the address translation stores, for indicating whether an address translation store may have stored a main store address of any page frame of a group of at least one selected page frame, at least since initialization of the first indicating means;

means, cooperative with the first indicating means and with the address translation stores, for flushing address translation stores indicated by the first indicating means not to have been flushed, at a time independent of initialization of the first indicating means and independent of completion of execution of instructions executing in the processing system at initialization of the first indicating means;

means, cooperative with the flushing means and with the second indicating means, for selecting from the group a page frame indicated not to may have had its address stored by an address translation store, after flushing of the address translation stores indicated not to have been flushed; and means, cooperative with the selecting means, for storing a page in the page frame selected by the selecting means.

2. The system of claim 1 wherein the second indicating means comprise means for preventing the address translation stores from storing the main store address of any page frame of the group.

3. The system of claim 1 further including page table means having at least one entry for identifying a page frame corresponding to a virtual page, and at least one validity indicating means each associated with an entry of the page table means; and wherein the second indicating means comprise means for invalidating the validity indicating means of page table means entries identifying page frames of the group.

4. The system of claim 1 further including page table means having at least one entry for identifying a page frame corresponding to a virtual page;

wherein the second indicating means comprise means, associated with at least those page frames of the group which are identified by at least one entry of the page table means, for signaling whether an associated page frame has been referenced; and wherein the selecting means comprise means, cooperative with the signaling means, for selecting from the group a page frame signaled not to have been referenced.

5. Paging apparatus for a processing system using paged virtual storage addressing and including an addressable main store having a plurality of page frames for storing selected pages of information, and a plurality of flushable address translation stores for storing the main store addresses corresponding to selected virtual storage addresses, comprising:

means for sequestering a first group of at least one page frame, the sequestering means including means for preventing the address translation stores from storing the main store address of any page frame of the first group;

means, cooperative with the sequestering means and with the address translation stores, for indicating whether the plurality of address translation stores have been flushed since the first group was sequestered;

means, cooperative with the indicating means, for transferring page frames from the first group to a second group of page frames, after the plurality of address translation stores have been flushed;

means for removing a page frame from the second group; and means, cooperative with the removing means, for storing a page in the removed page frame.

6. The apparatus of claim 5 further comprising:

means, cooperative with the indicating means and with the address translation stores, for flushing address translation stores indicated by the indicating means not to have been flushed, at a time independent of sequestering of the first group and independent of completion of execution of instructions executing in the processing system at sequestering of the first group.

7. The apparatus of claim 6 further comprising:

means, cooperative with the indicating means and with the flushing means, for causing the flushing means to flush address translation stores indicated not to have been flushed, when the number of page frames in the second group falls below a predetermined minimum.

8. The apparatus of claim 5 for the processing system that further includes page table means having at least one entry for identifying a page frame corresponding to a virtual page, and at least one validity indicating means each associated with an entry of the page table means; and wherein the preventing means comprise means for invalidating the validity indicating means of page table means entries identifying page frames of the first group.

9. Paging apparatus for a processing system using paged virtual storage addressing and including an addressable main store having a plurality of page frames for storing selected pages of information, and a plurality of flushable address translation stores for storing the main store addresses corresponding to selected virtual storage addresses, comprising:

means for sequestering a group of at least one page frame, the sequestering means including initializable signaling means, cooperative with the address translation stores, for signaling whether an address translation store may have stored the main store address of a page frame of the group since the signaling means were initialized, and means for initializing the signaling means;

means, cooperative with the sequestering means and with the address translation stores, for indicating whether the plurality of address translation stores have been flushed since the group was sequestered;

means, cooperative with the signaling means, for selecting from the group a page frame whose address is signaled not to may have been stored in an address translation store;

means, cooperative with the indicating means and with the selecting means, for enabling the selecting means to select a page frame from the group only after the plurality of address translation stores have been flushed; and means, cooperative with the selecting means, for storing a page in the selected page frame.

10. The apparatus of claim 9 for the processing system that further includes page table means having at least one entry for identifying a page frame corresponding to a virtual page;

wherein the signaling means comprise means, associated with page frames of the group which are also identified by at least one entry of the page table means, for signaling whether an associated page frame of the group has been referenced since the signaling means were initialized; and wherein the selecting means comprise means for selecting a page frame signaled not to have been referenced.

11. The apparatus of claim 9 further comprising:

means, cooperative with the indicating means and with the address translation stores, for flushing address translation stores indicated by the indicating means not to have been flushed, at a time independent of sequestering of the group and independent of completion of execution of instructions executing in the processing system at sequestering of the group.

12. Paging apparatus for a processing system using paged virtual memory addressing and including an addressable main store having a plurality of page frames for storing selected pages of information, a plurality of address translation stores for storing the main store addresses corresponding to selected virtual addresses, means for flushing the address translation stores, and page table means having at least one entry for storing a main store address corresponding to a virtual page and at least one validity indicating means each associated with an entry of the page table means, the paging apparatus comprising:

first and second means for storing identifications of selected page frames;

a plurality of initializable indicating means, each associated with an address translation store and cooperative with the flushing means, each for indicating whether the associated address translation store has been flushed since initialization of the indicating means;

means, cooperative with the first storage means, for selecting at least one page frame and for storing its identification in the frist storage means;

means, cooperative with the selecting means, for invalidating the validity indicating means of page table means entries storing the main store addresses of the selected at least one page frame;

means, cooperative with the selecting means, for initializing the plurality of indicating means upon selection of the at least one page frame;

means, cooperative with the plurality of indicating means, for transferring page frame identifications from the first storage means to the second storage means, after the plurality of address translation stores are indicated to have been flushed;

means, cooperative with the second storage means, for removing an identification from the second storage means; and means, cooperative with the removing means, for storing a selected page in the page frame identified by the removed identification.

13. The apparatus of claim 12 further comprising:

means, cooperative with the removing means, for storing the address of the page frame identified by the removed identification in the page table means entry corresponding to the selected virtual page and for validating the validity indicating means of that page table means entry.

14. The apparatus of claim 12 further comprising:

means, cooperative with the plurality of indicating means and with the address translation stores, for causing the flushing means to flush address translation stores indicated by the indicating means not to have been flushed, at a time independent of initialization of the indicating means, independent of invalidation of the validity indicating means, and independent of completion of execution of instructions executing in the processing system either at initialization of the indicating means or at invalidation of the validity indicating means.

15. Paging apparatus for a processing system using paged virtual memory addressing and including an addressable main store having a plurality of page frames for storing selected pages of information, a plurality of address translation stores for storing the main store addresses corresponding to selected virtual addresses, and means for flushing the address translation stores, comprising:

a plurality of descriptor means each for describing at least one page frame, each descriptor means including at least one initializable signaling means each associated with a page frame for signaling whether the associated page frame has been referenced;

a plurality of groups of indicating means, each group associated with a different one of the plurality of descriptor means and each comprising a plurality of indicating means, each indicating means associated with an address translation store and cooperative with the flushing means for indicating whether the associated address translation store has been flushed;

means, cooperative with the plurality of descriptor means, for searching through a descriptor means to select page frames signaled by the associated signaling means to be unreferenced and for intializing the signaling means of the searched descriptor means, the searching means exiting the searched descriptor means, after searching that descriptor means, to enter and search another descriptor means;

means, cooperative with the groups of indicating means for enabling the searching means to search a descriptor means only after the indicating means of the group associated with that descriptor means indicate that the plurality of address translation stores have been flushed;

means, cooperative with the searching means and with the groups of indicating means, for initializing the indicating means of the group associated with the searched descriptor means being exited by the searching means; and means, cooperative with the searching means, for storing selected pages in the selected page frames.

16. The apparatus of claim 15 for the processing system that further includes page table means having at least one entry for storing a main store address corresponding to a virutal page, and at least one validity indicating means each associated with an entry of the page table means, the apparatus further comprising:

means, cooperative with the searching means, for invalidating the validity indicating means of page table means entries storing the main store addresses of the selected page frames; and means, cooperative with the means for storing selected pages in the selected page frames, for storing the main store addresses, of those selected page frames that store selected pages, in the entries of the page table means, and for validating the validity indication means of the page table means entries corresponding to the selected pages.

17. The apparatus of claim 15 further comprising:

means, cooperative with the searching means and with the groups of indicating means, for causing the flushing means to flush address translation stores that are indicated not to have been flushed by the indicating means of the group associated with a descriptor means being entered by the searching means.

18. Method of paging in a processing system using paged virtual storage addressing and including an addressable main store having a plurality of page frames for storing selected pages of information, and a plurality of flushable address translation stores for storing the main store addresses corresponding to selected virtual storage address, comprising the steps of:

initializing signaling of whether the plurality of address translation stores have been flushed since initialization of the signaling;

indicating whether an address translation store may have stored a main store address of any page frame of a group of at least one selected page frame, at least since initialization of the signaling;

flushing address translation stores signaled not to have been flushed, at a time independent of initialization of the signaling and independent of completion of execution of instructions executing in the processing system at initialization of the signaling;

selecting from the group a page frame indicated not to may have had its address stored by an address translation store, after the plurality of address translation stores have been signaled to have been flushed; and storing a page in the page frame selected from the group.

19. The method of claim 18 wherein the step of indicating comprises the step of preventing the address translation stores from storing the main store address of any page frame of the group.

20. The method of claim 18 in a system further including page table means having at least one entry for identifying a page frame corresponding to a virtual page, and at least one validity indicating means each associated with an entry of the page table means, wherein the step of indicating comprises the step of:

invalidating the validity indicating means of page table means entries identifying page frames of the group.

21. The method of claim 18 in a system further including page table means having at least one entry for identifying a page frame corresponding to a virtual page, wherein the step of indicating comprises the step of indicating whether any of the frames of the group which are identified by at least one entry of the page table means have been referenced; and wherein the step of selecting comprises the step of selecting from the group a page frame indicated not to have been referenced.

22. Method of paging in a processing system using paged virtual storage addressing and including an addressable main store having a plurality of page frames for storing selected pages of information, and a plurality of flushable address translation stores for storing the main store addresses corresponding to selected virtual storage addresses, comprising the steps of:

sequestering a first group of at least one page frame, by preventing the address translation stores from storing the main store address of any page frame of the first group;

indicating whether the plurality of address translation stores have been flushed since the first group was sequestered;

transferring page frames from the first group to a second group of page frames, after the plurality of address translation stores are indicated to have been flushed;

removing a page frame from the second group; and storing a page in the removed page frame.

23. The method of claim 22 in a system further including page table means having at least one entry for identifying a page frame corresponding to a virtual page, and at least one validity indicating means each associated with an entry of the page table means, wherein the step of sequestering by preventing comprises the step of:

invalidating the validity indicating means of page table means entries identifying page frames of the first group.

24. The method of claim 22 wherein the step of transferring is preceded by the step of:

flushing address translation stores indicated not to have been flushed, at a time independent of sequestering of the first group and independent of completion of execution of instructions executing in the processing system at sequestering of the first group.

25. The method of claim 24 wherein the step of flushing comprises the step of:

flushing address translation stores indicated to be unflushed, when the number of page frames in the second group falls below a predetermined minimum.

26. Method of paging in a processing system using paged virtual storage addressing and including an addressable main store having a plurality of page frames for storing selected pages of information, and a plurality of flushable address translation stores for storing the main store addresses corresponding to selected virtual storage address, comprising the steps of:

sequestering a group of at least one page frame by initializing signaling of whether an address translation store may have stored the main store address of a page frame of the group since the initialization;

indicating whether the plurality of address translation stores have been flushed since the group was sequestered;

enabling selection of a page frame from the group only after the plurality of address translation stores are indicated to have been flushed;

selecting from the group a page frame whose address is signaled not to may have been stored in an address translation store; and storing a page in the selected page frame.

27. The method of claim 26 in a system further including page table means having at least one entry for identifying a page frame corresponding to a virtual page, wherein the step of sequestering by initializing signaling comprises the step of initializing signaling of whether a page frame of the group is also identified by at least one entry of the page table means has been referenced since the initialization; and wherein the step of selecting comprises the step of selecting a page frame of the group signaled not to have been referenced.

28. The method of claim 26 wherein the step of enabling selection is preceded by the step of:

flushing address translation stores indicated to be unflushed, at a time independent of sequestering of the group and independent of completion of execution of instructions executing in the processing system at sequestering of the group.

29. Method of paging in a processing system using paged virtual memory addressing and including an addressable main store having a plurality of page frames for storing selected pages of information, a plurality of address translation stores for storing the main store addresses corresponding to selected virtual addresses, means for flushing the address translation stores, a plurality of flush-indicating means each associated with an address translation store and cooperative with the flushing means for indicating that the associated address translation store has been flushed, and page table means having at least one entry for storing a main store address corresponding to a virtual page and at least one validity indicating means each associated with an entry of the page table means, the method of paging comprising the steps of:

selecting at least one page frame;

invalidating the validity indicating means of page table means entire storing the main store address of any selected at least one page frame;

storing identification of the selected at least one page frame in first storage means;

initializing the plurality of flush-indicating means;

transferring the stored page frame identification from the first storage means to second storage means, after the plurality of address translation stores are indicated to have been flushed;

removing an identification from the second storage means; and storing a selected page in the page frame identified by the removed identification.

30. The method of claim 29 further comprising the steps of:

storing the address of the page frame identified by the removed identification in a page table means entry corresponding to the selected virtual page; and validating the validity indicating means of that page table means entry.

31. The method of claim 29 wherein the step of transferring is preceded by the step of:

causing the flushing means to flush address translation stores indicated to be unflushed, at a time independent of initialization of the flush-indicating means, independent of invalidation of the validity indicating means, and independent of completion of execution fo instructions executing in the processing system either at initialization of the flush-indicating means or at invalidation of the validity indicating means.

32. Method of paging in a processing system using paged virtual memory addressing and including an addressable main store having a plurality of page frames for storing selected pages of information, a plurality of address translation stores for storing the main store addresses corresponding to selected virtual addresses, means for flushing the address translation stores, a plurality of descriptor means each for describing selected page frames, each descriptor means including initializable signaling means each associated with a page frame for signaling that the associated page frame has been referenced, and a plurality of groups of indicators, each group associated with a different one of the plurality of descriptor means and each comprising a plurality of indicators each indicator associated with an address translation store and responsive to the flushing means for indicating that the associated address translation store has been flushed, the method of paging comprising the steps of:

searching through a descriptor means to select page frames signaled by the associated signaling means to be unreferenced;

initializing the signaling means of the descriptor means when searching the descriptor means;

exiting the searched descriptor means after searching that descriptor means;

initializing the indicators of the group associated with the searched descriptor means;

allowing searching of another descriptor means in response to the indicators of the group associated with that descriptor means indicating that the address translation stores have been flushed; and storing selected pages in the selected page frames.

33. The method of claim 32 in a system further inclduing page table means having at least one entry for storing a main store address corresponding to a virtual page, and at least one validity indicating means each associated with an entry of the page table means, wherein the step of searching is followed by the step of invalidating the validity indicating means of page table means entries storing the main store addresses of the selected page frames; and wherein the step of storing is followed by the steps of storing the main store addresses, of selected page frames that store selected pages, in the page table means entries corresponding to the selected pages, and validating the validity indicating means of the page table means entries corresponding to the selected pages.

34. The method of claim 32 wherein the step of allowing searching is preceded by the step of:

casuing the flushing means to flush address translation stores indicated by the indicators of the group associated with the other descriptor means to be unflushed.

35. In a processing system using paged virtual storage addressing and including an addressable main store having a plurality of page frames for storing selected pages of information, and a plurality of flushable address translation stores for storing the main store addresses corresponding to selected virtual storage addresses, a paging apparatus comprising:

initializable flush-indicating means, cooperative with the address translation stores, for indicating whether the plurality of address translation stores have been flushed since initialization of the flush-indicating means;

reference-indicating means, cooperative with the flush-indicating means, for indicating whether a selected at least one page frame has been referenced since initialization of the flush-indicating means;

means, cooperative with the flush-indicating means and with the reference-indicating means, for selecting from the at least one page frame a page frame indicated not to have been referenced, after the plurality of address translation stores are indicated to have been flushed; and means, cooperative with the selecting means, for storing a page in the page frame selected by the selecting means.

36. Method of paging in a processing system using paged virtual storage addressing and including an addressable main store having a plurality of page frames for storing selected pages of information, and a plurality of flushable address translation stores for storing the main store addresses corresponding to selected virtual storage address, comprising the steps of:

initializing a flush-indiction of whether the plurality of address translation stores have been flushed since initialization of the flush-indication;

indicating whether a selected at least one page frame has been referenced since initialization of the flush-indication;

selecting from the at least one page frame a page frame indicated not to have been referenced, after the plurality of address translation stores are indicated to have been flushed; and storing a page in the frame selected by the step of selecting.

* * * * *

UNITED STATES PATENT AND TRADEMARK OFFICE

CERTIFICATE OF CORRECTION

PATENT NO. : 4,577,274

DATED : March 18, 1986

INVENTOR(S) : Gary S. Ho, Ralph W. Peterson

It is certified that error appears in the above-identified patent and that said Letters Patent is hereby corrected as shown below:

Column 24, line 61, claim 12, "frist" should be "first";
Column 25, line 55, claim 15, "intializing" should be "initializing";
Column 25, line 60, claim 15, after "indicating means" insert a comma;
Column 26, line 19, claim 16, "indication" should be "indicating";
Column 28, line 42, claim 29, "means entire" should be "means entries";
Column 29, line 1, claim 31, "fo instructions" should be "of instructions";

Column 30, line 6, claim 34, "casuing" should be "causing";
Column 30, line 38, claim 41, "flush-indiction" should be "flush-indication".

Signed and Sealed this

Fourth Day of May, 1993

Attest:

Michael K. Kirk

MICHAEL K. KIRK

*Attesting Officer* *Acting Commissioner of Patents and Trademarks*